US012671274B2

(12) United States Patent
Gallagher et al.

(10) Patent No.: US 12,671,274 B2
(45) Date of Patent: Jun. 30, 2026

(54) ALIGNMENT POSITIONING VERIFICATION AND INDICATOR FOR WIRELESS POWER TRANSFER

(71) Applicant: InductEV Inc., King of Prussia, PA (US)

(72) Inventors: Samual J. Gallagher, Malvern, PA (US); Edward J. Gander, Morton, PA (US)

(73) Assignee: InductEV Inc., King of Prussia, PA (US)

( * ) Notice: Subject to any disclaimer, the term of this patent is extended or adjusted under 35 U.S.C. 154(b) by 286 days.

(21) Appl. No.: 18/388,522

(22) Filed: Nov. 9, 2023

(65) Prior Publication Data

US 2025/0158453 A1     May 15, 2025

(51) Int. Cl.
*H04B 5/79*          (2024.01)
*B60L 53/126*       (2019.01)
(Continued)

(52) U.S. Cl.
CPC ............ *H02J 50/90* (2016.02); *B60L 53/126* (2019.02); *H02J 50/10* (2016.02); *H02J 50/402* (2020.01);
(Continued)

(58) Field of Classification Search
CPC .......... H02J 50/90; H02J 50/10; H02J 50/402; H02J 50/80; B60L 53/126; B60L 2250/16;
(Continued)

(56) References Cited

U.S. PATENT DOCUMENTS

| 4,219,821 A | 8/1980 | Selim |
| 5,573,090 A | 11/1996 | Ross |

(Continued)

FOREIGN PATENT DOCUMENTS

| CN | 106981215 A | 7/2017 |
| CN | 110136198 A | 8/2019 |

(Continued)

OTHER PUBLICATIONS

European Application No. 19834203.2, Extended Search Report mailed Jul. 29, 2021.

(Continued)

*Primary Examiner* — Andrew Wendell
(74) *Attorney, Agent, or Firm* — PEARL COHEN ZEDEK LATZER BARATZ LLP

(57) ABSTRACT

A position offset between a primary coil and a secondary coil of an inductive power transfer pair is determined using a region classifier model and an absolute position model of an operational charging region between the primary coil and the secondary coil. During operation, radio signal information including magnitudes and phase differences is collected from respective radio receivers of a ground transceiver assembly and a vehicle transceiver assembly. The radio signal information and the region classifier model are used to determine whether the vehicle has entered or departed the operational charging region, and the radio signal information and absolute position model are used to determine absolute or relative offset positions of boresights of the primary coil and the secondary coil. A display provides an indication of the absolute or relative offset positions between the boresights of the primary coil and the secondary coil.

43 Claims, 11 Drawing Sheets

(51) Int. Cl.
    *H02J 50/10*      (2016.01)
    *H02J 50/40*      (2016.01)
    *H02J 50/90*      (2016.01)
    *H04B 1/3822*    (2015.01)

(52) U.S. Cl.
    CPC ....... *B60L 2250/16* (2013.01); *B60L 2260/42* (2013.01); *B60L 2260/46* (2013.01)

(58) Field of Classification Search
    CPC .. B60L 2260/42; B60L 2260/46; B60L 53/36; B60L 53/38; Y02T 10/7072; H04B 5/79; H04B 1/082; H04B 1/3822
    See application file for complete search history.

(56)          References Cited

U.S. PATENT DOCUMENTS

| | | | |
|---|---|---|---|
| 8,513,915 | B2 | 8/2013 | Patel |
| 8,937,454 | B2 * | 1/2015 | Baarman ............... B60L 53/122 |
| | | | 320/108 |
| 9,260,026 | B2 * | 2/2016 | Miller ................... B60L 53/126 |
| 9,631,950 | B2 * | 4/2017 | Raedy ................... B60L 53/126 |
| 9,882,416 | B2 | 1/2018 | Amari |
| 10,135,496 | B2 | 11/2018 | Long et al. |
| 2006/0136109 | A1 | 6/2006 | Tanaka et al. |
| 2008/0265684 | A1 | 10/2008 | Farkas |
| 2010/0308767 | A1 | 12/2010 | Rofougaran et al. |
| 2011/0084658 | A1 * | 4/2011 | Yamamoto .............. B60L 5/005 |
| | | | 320/108 |
| 2011/0114401 | A1 | 5/2011 | Kanno |
| 2011/0309988 | A1 | 12/2011 | Parsche |
| 2012/0123670 | A1 | 5/2012 | Uyeki |
| 2012/0262002 | A1 | 10/2012 | Widmer et al. |
| 2013/0099962 | A1 | 4/2013 | Katz |
| 2013/0270921 | A1 | 10/2013 | Boys et al. |
| 2013/0307468 | A1 * | 11/2013 | Lee ....................... H02J 50/402 |
| | | | 320/108 |
| 2014/0125140 | A1 | 5/2014 | Widmer et al. |
| 2014/0183966 | A1 | 7/2014 | Suzuki et al. |
| 2014/0217966 | A1 | 8/2014 | Schneider et al. |
| 2015/0094887 | A1 | 4/2015 | Kawashima |
| 2015/0137750 | A1 * | 5/2015 | Kirby ..................... H02J 50/12 |
| | | | 320/108 |
| 2015/0202970 | A1 | 7/2015 | Huang et al. |
| 2015/0236513 | A1 | 8/2015 | Covic et al. |
| 2015/0260835 | A1 | 9/2015 | Widmer et al. |
| 2016/0005159 | A1 * | 1/2016 | Hallamask ............. B64U 10/60 |
| | | | 701/300 |
| 2016/0025821 | A1 | 1/2016 | Widmer et al. |
| 2016/0031332 | A1 * | 2/2016 | Garcia Briz .......... H02J 50/402 |
| | | | 320/108 |
| 2016/0288657 | A1 | 10/2016 | Tokura |
| 2016/0318413 | A1 | 11/2016 | Roehrl et al. |
| 2017/0111088 | A1 | 4/2017 | Seong et al. |
| 2017/0133889 | A1 | 5/2017 | Yeo et al. |
| 2017/0136880 | A1 | 5/2017 | Ricci |
| 2017/0274787 | A1 | 9/2017 | Salter et al. |
| 2017/0313202 | A1 | 11/2017 | Amari |
| 2017/0361723 | A1 * | 12/2017 | Elshaer ................. B60L 53/126 |
| 2018/0090992 | A1 | 3/2018 | Shrivastava et al. |
| 2018/0111492 | A1 | 4/2018 | McCool et al. |
| 2018/0178666 | A1 * | 6/2018 | Javaid ..................... B60L 53/39 |
| 2018/0304755 | A1 | 10/2018 | Beaver et al. |
| 2018/0312071 | A1 | 11/2018 | Long et al. |
| 2018/0354382 | A1 | 12/2018 | Schlaudraff |
| 2018/0375390 | A1 | 12/2018 | Sieber |
| 2019/0044392 | A1 | 2/2019 | Chowdhury et al. |
| 2019/0197354 | A1 | 6/2019 | Law et al. |
| 2019/0255965 | A1 | 8/2019 | Hocke et al. |
| 2019/0356178 | A1 | 11/2019 | Widmer et al. |
| 2019/0381891 | A1 * | 12/2019 | Moghe ................... G06N 20/00 |
| 2020/0006988 | A1 | 1/2020 | Leabman |
| 2020/0039371 | A1 | 2/2020 | Herzog et al. |
| 2020/0094697 | A1 | 3/2020 | Nagata |
| 2020/0127506 | A1 | 4/2020 | McMahon et al. |
| 2020/0136439 | A1 | 4/2020 | Seong et al. |
| 2020/0161896 | A1 * | 5/2020 | Fechting ................. H02J 50/10 |
| 2022/0126710 | A1 * | 4/2022 | Ward ...................... B60L 53/35 |
| 2022/0134899 | A1 | 5/2022 | Eide et al. |
| 2024/0029948 | A1 * | 1/2024 | Niederhauser .......... H02J 50/10 |

FOREIGN PATENT DOCUMENTS

| | | |
|---|---|---|
| JP | 2011106216 A | 6/2011 |
| WO | 2020013989 A1 | 1/2020 |
| WO | 2023129307 A1 | 7/2023 |

OTHER PUBLICATIONS

International Search Report and Written Opinion received in Patent Cooperation Treaty Application No. PCT/US2020/063573, dated Feb. 26, 2021.

International Search Report and Written Opinion received in Patent Cooperation Treaty Application No. PCT/US2019/039161, dated Sep. 24, 2019.

International Search Report and Written Opinion received in Patent Cooperation Treaty Application No. PCT/US2022/050766, dated Feb. 15, 2023.

International Search Report and Written Opinion received in Patent Cooperation Treaty Application No. PCT/US2024/055010, dated Mar. 15, 2025.

Supplementary European Search Report received in European Application No. 22917163.2, dated Mar. 28, 2025.

U.S. Appl. No. 14/541,563, Examiner Interview Summary mailed Jan. 18, 2018, 2 pgs.

U.S. Appl. No. 14/541,563, Final Office Action mailed Nov. 2, 2017, 18 pgs.

U.S. Appl. No. 14/541,563, Non Final Office Action mailed Apr. 20, 2017, 30 pgs.

U.S. Appl. No. 14/541,563, Non Final Office Action mailed Aug. 8, 2016, 22 pgs.

U.S. Appl. No. 14/541,563, Notice of Allowance mailed Apr. 3, 2018.

U.S. Appl. No. 14/541,563, Response filed Jan. 12, 2018 to Final Office Action mailed Nov. 2, 2017, 11 pgs.

U.S. Appl. No. 14/541,563, Response filed Jul. 20, 2017 to Non Final Office Action mailed Apr. 20, 2017, 11 pgs.

U.S. Appl. No. 14/541,563, Response filed Dec. 8, 2016 to Non Final Office Action mailed Aug. 8, 2016, 10 pgs.

U.S. Appl. No. 16/030,036, Non Final Office Action mailed Mar. 27, 2020, 12 pgs.

U.S. Appl. No. 16/030,036, Notice of Allowance mailed Jun. 24, 2020, 9 pgs.

U.S. Appl. No. 16/030,036, Response filed Feb. 21, 2020 to Restriction Requirement mailed Feb. 19, 2020, 7 pgs.

U.S. Appl. No. 16/030,036, Response filed Jun. 5, 2020 to Non Final Office Action mailed Mar. 27, 2020, 9 pgs.

U.S. Appl. No. 16/030,036, Restriction Requirement mailed Feb. 19, 2020, 8 pgs.

U.S. Appl. No. 16/030,036, Supplemental Amendment Filed Mar. 2, 2020 to Restriction Requirement Mailed Feb. 21, 2020, 7 pgs.

Wrigley, "Folded and Loaded Antennas", rfcafe.com, Oct. 23, 2019, retrieved on [Jan. 30, 2021], Retrieved from the internet entire document.

\* cited by examiner

PRIOR ART

701
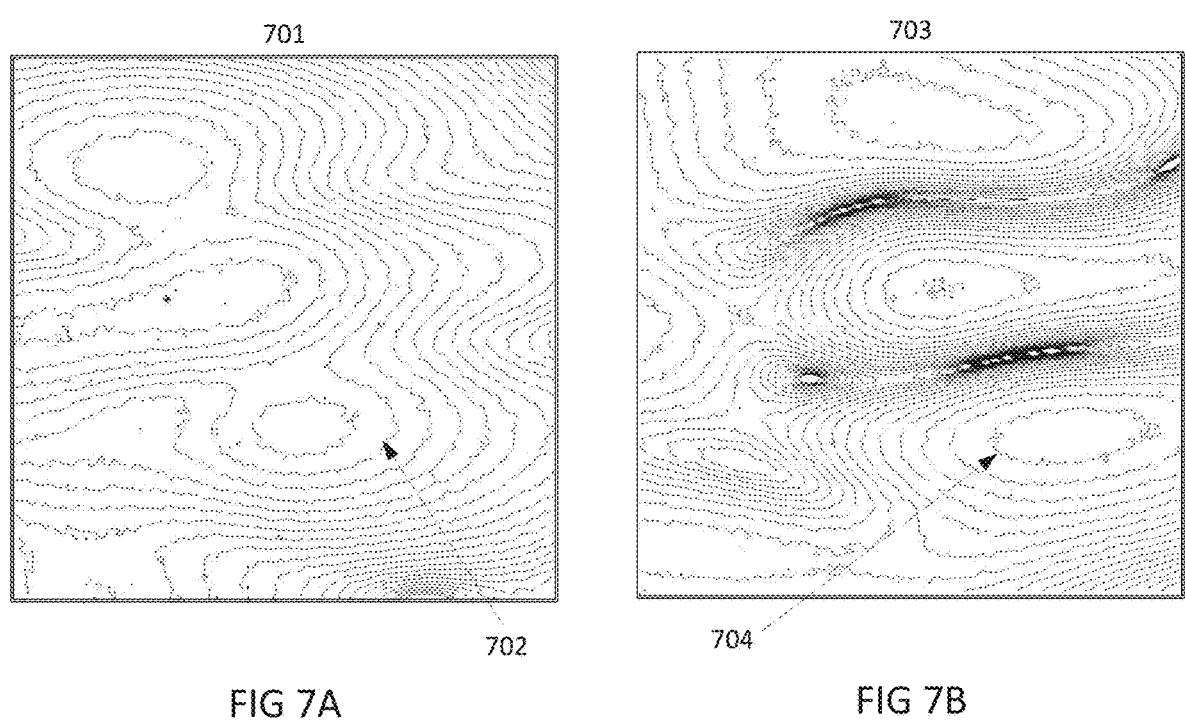
702
FIG 7A
703
704
FIG 7B
801
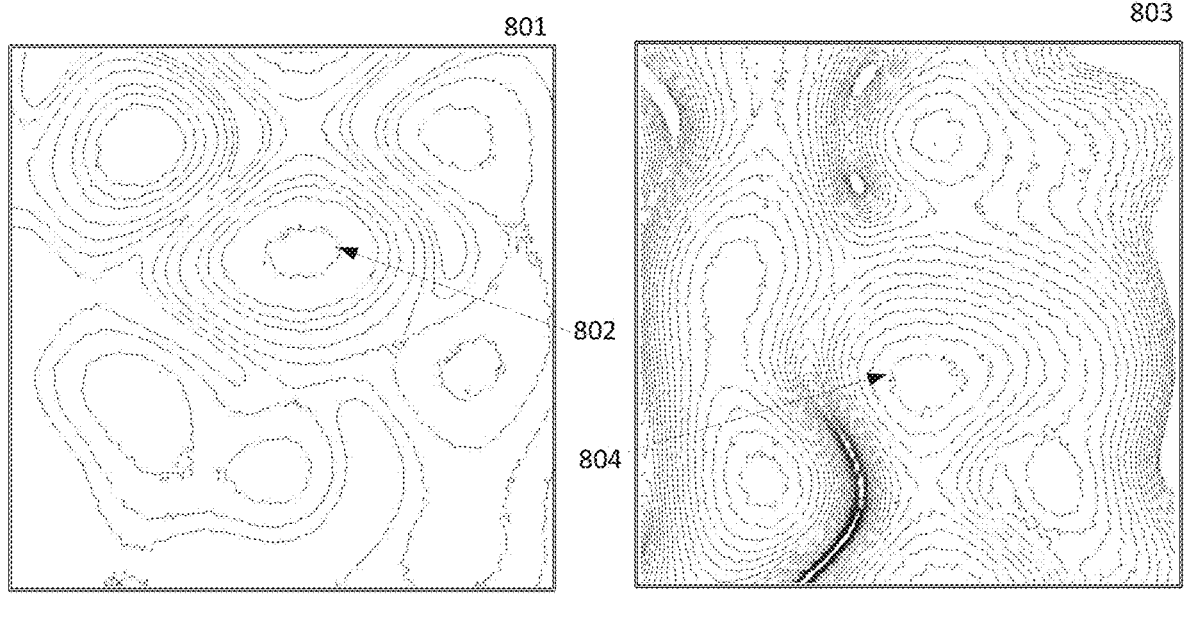
802
804
FIG 8A
803
FIG 8B

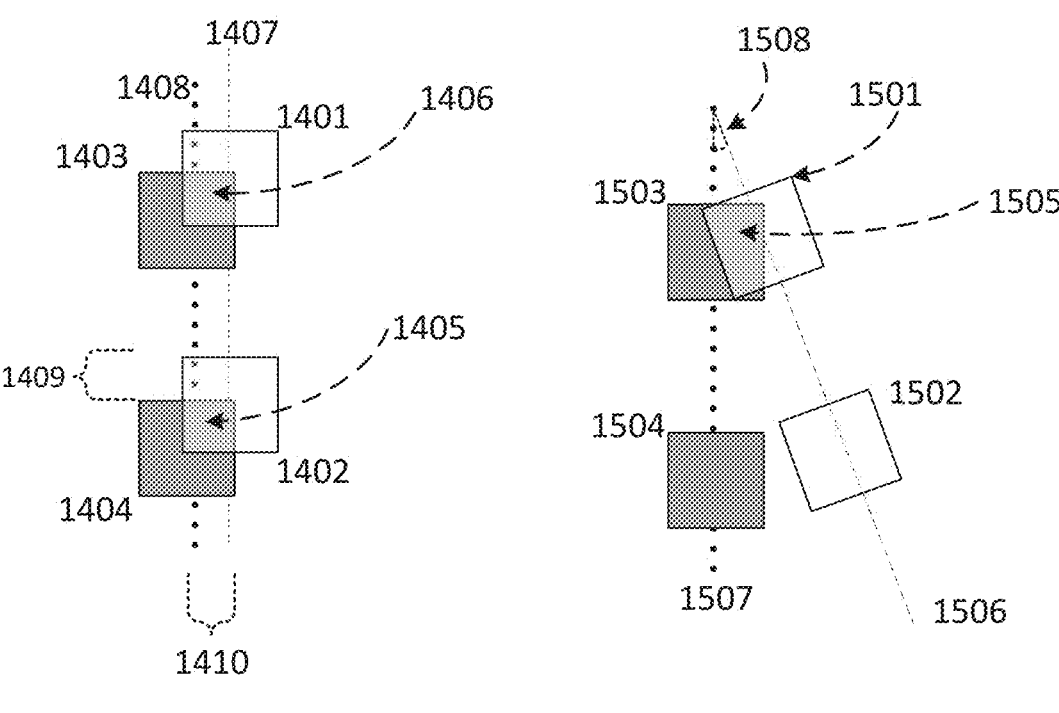
FIG 14
FIG 15
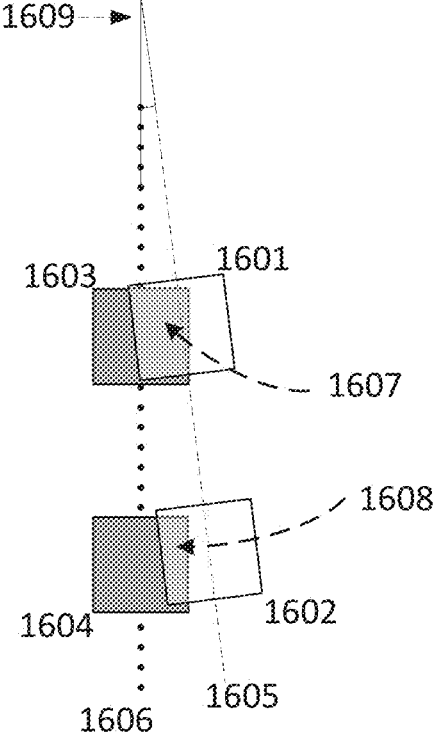
FIG 16

FIG 17
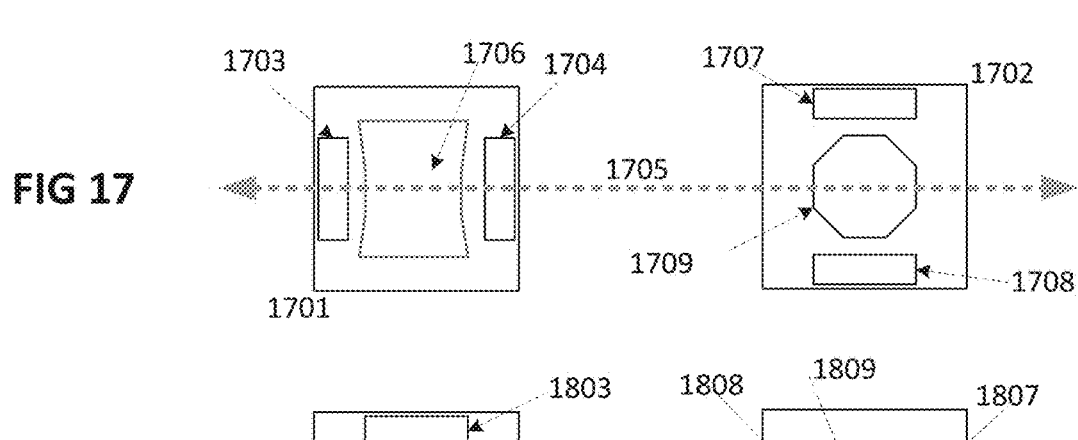
FIG 18
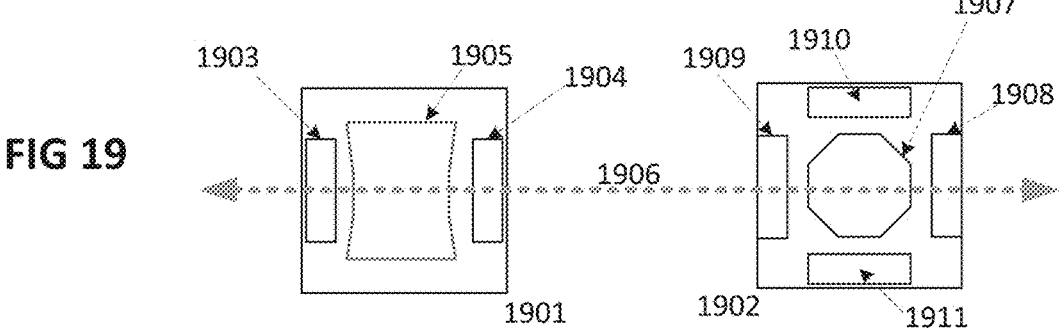
FIG 19
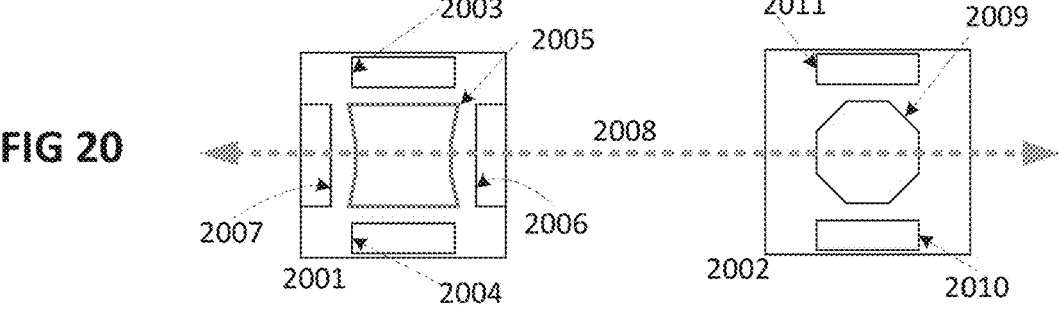
FIG 20
FIG 21
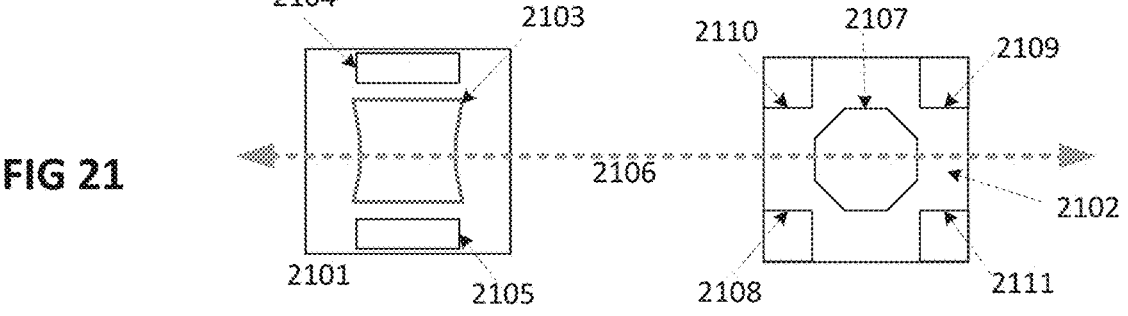

ALIGNMENT POSITIONING VERIFICATION AND INDICATOR FOR WIRELESS POWER TRANSFER

CROSS REFERENCE TO RELATED APPLICATIONS

This application is related in subject matter to the commonly owned U.S. Pat. No. 10,040,360 entitled METHOD AND APPARATUS FOR THE ALIGNMENT OF VEHICLES PRIOR TO WIRELESS CHARGING INCLUDING A TRANSMISSION LINE THAT LEAKS A SIGNAL FOR ALIGNMENT, the commonly owned U.S. Pat. No. 10,814,729 entitled METHOD AND APPARATUS FOR THE ALIGNMENT OF A VEHICLE AND CHARGING COIL PRIOR TO WIRELESS CHARGING, the commonly owned U.S. Pat. No. 11,241,970 entitled METHOD AND APPARATUS FOR THE ALIGNMENT OF VEHICLES PRIOR TO WIRELESS CHARGING, the commonly owned U.S. Patent Publication No. 2022/0126710 entitled METHOD AND APPARATUS FOR THE SELECTIVE GUIDANCE OF VEHICLES TO A WIRELESS CHARGER, the commonly owned U.S. Pat. No. 10,135,496 entitled NEAR FIELD, FULL DUPLEX DATA LINK FOR USE IN STATIC AND DYNAMIC RESONANT INDUCTION WIRELESS CHARGING, the commonly owned U.S. Pat. No. 10,826,565 entitled NEAR FIELD, FULL DUPLEX DATA LINK FOR RESONANT INDUCTION WIRELESS CHARGING, the commonly owned U.S. Pat. No. 11,121,740 entitled NEAR FIELD, FULL DUPLEX DATA LINK FOR RESONANT INDUCTION WIRELESS CHARGING, and the commonly owned U.S. Pat. No. 11,671,145 entitled NEAR FIELD, FULL DUPLEX DATA LINK FOR RESONANT INDUCTION WIRELESS CHARGING. The contents of these patents and patent publication are hereby incorporated by reference.

FIELD OF INVENTION

The present disclosure relates generally to wireless power transfer, and more specifically to devices, systems, and methods for wireless power transfer to remote systems such as vehicles including batteries. More particularly, the present disclosure relates to achieving and verifying alignment of primary induction charging coils and secondary induction coils on a vehicle in a wireless power transfer system.

BACKGROUND

Inductively coupled wireless charging makes use of an air core transformer consisting of pairs of concentric coils (the primary, a.k.a. the "transmitter," and the secondary, a.k.a. the "receiver") displaced along a common coil axis. Modular deployments of geometrically arranged paired primary and secondary coil assemblies can be used to increase power throughput using parallel inductive power transmissions.

The transformer coupling coefficient and wireless power transfer efficiency is degraded if the paired primary and secondary coils are not axially aligned. For high power charging, vehicle wireless charging includes some provision so that the individual vehicle parking position is accurate and repeatable to ensure paired coil axial alignment.

BRIEF DESCRIPTION OF THE DRAWING(S)

The foregoing and other beneficial features and advantages of the invention will become apparent from the following detailed description in connection with the attached figures, of which:

FIG. 7A illustrates the received signal strength of the near-field transmission from the vehicle-mounted transmitter at a first ground-unit receiver antenna.

FIG. 7B illustrates the received signal strength of the near-field transmission from the vehicle-mounted transmitter at a separate but co-planar second ground-unit receiver antenna.

FIG. 8A illustrates the received signal strength of the near-field transmission from the ground-mounted transmitter at a first vehicle-based receiver antenna.

FIG. 8B illustrates a signal strength map over a tested region as created from readings from a second vehicle-based receiver antenna.

FIG. 14 is a diagram illustrating an example vehicle positioning where the vehicle-side first and second operational regions (corresponding to a 1×2 modular in-line WPT system) are slightly offset with corresponding ground-side first and second operational regions.

FIG. 15 is a diagram illustrating an example vehicle positioning where the vehicle-side first and second operational regions (corresponding to a 1×2 modular in-line WPT system) are badly positioned relative to corresponding ground-side first and second operational regions.

FIG. 16 is a diagram illustrating an example vehicle positioning where the vehicle-side first and second operational regions (corresponding to a 1×2 modular in-line WPT system) are slightly angularly offset with corresponding ground-side first and second operational regions.

FIG. 17 is a diagram depicting the topside of a ground assembly and the underside of a vehicle assembly immediately prior to alignment along a first direction of travel relative to the ground assembly.

FIG. 18 is a diagram depicting the topside of a ground assembly and the underside of a vehicle assembly immediately prior to alignment along a second direction of travel relative to the ground assembly.

FIG. 19 is a diagram depicting an alternative receiver antenna structure for a ground assembly where the topside of the ground assembly and the underside of a vehicle assembly immediately prior to alignment are shown.

FIG. 20 is a diagram depicting an alternative receiver antenna structure for a vehicle assembly where the topside of a ground assembly and the underside of the vehicle assembly immediately prior to alignment are shown.

FIG. 21 is a diagram depicting an alternative receiver antenna structure for a ground assembly where the topside of the ground assembly and the underside of a vehicle assembly immediately prior to alignment are shown.

DETAILED DESCRIPTION OF THE PREFERRED EMBODIMENT(S)

Figure 1:
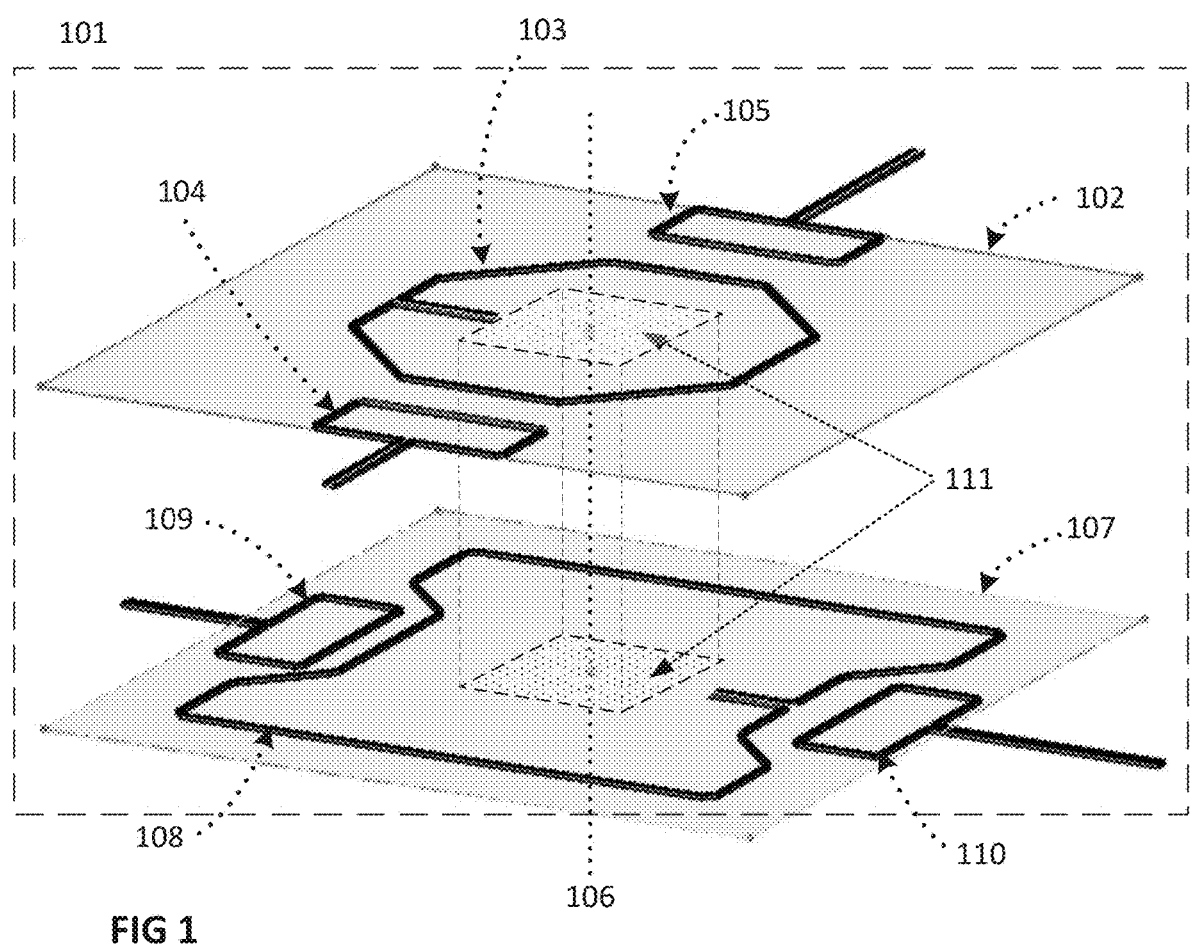
FIG. 1 is a perspective view of an exemplary antenna layout enabling alignment of the WPT primary and secondary coils across an airgap of a sample wireless power transfer (WPT) system.

A detailed description of illustrative embodiments is described below with reference to FIGS. 1-21. Although this description provides a detailed description of possible implementations, it should be noted that these details are intended to be exemplary and in no way delimit the scope of the inventive subject matter.

The term "battery" is used herein to depict a generic chemical energy storage system and could be replaced, supplemented, or hybridized with other portable energy storage systems (e.g., solid-state batteries, reversable fuel cells, ultra-capacitors). Also, while many of the examples used are of a wireless power transfer (WPT) system used to power the onboard systems and charge the batteries of a stationary electric vehicle (EV), this use is by no means the only use contemplated.

The term electric vehicle (EV) includes all battery-operated electric vehicles (BEV) as well as hybrid EVs (HEV) and Dual charging (DBEV) with both plug-in and wireless charging capability.

For wireless power transfer (WPT) at high power (generally defined as over 22 kW), there is an increasing need for proper coil-to-coil alignment. The biggest need for proper alignment of the primary and secondary coils is to achieve a useful coupling factor for the inductive link. For any vehicle to be charged, the primary and secondary coil will have a given coil-to-coil-gap (cc-gap) that is related to the vehicle Z-gap (as defined in ISO 4130, "Road vehicles—Three-dimensional reference system and fiducial marks"), resulting in a limited budget for the positioning related coupling factor components (e.g., from zero misalignment to a maximum tolerated misalignment). As positioning misalignment increases, a lower coupling coefficient results. This lower coupling coefficient for a requested charging power necessarily results in a higher primary coil current, a higher output power, and lowered inductive link efficiency.

It is noted that the best alignment does not result in the highest power conveyed, but it is generally at the highest efficiency. With proper frequency adjustment, the efficiency as a function of misalignment can be relatively flat across the nominal operating range. Efficiency of the WPT System supporting subsystems is also enhanced by correct alignment since any decrease in primary coil current to achieve the requested power transfer results in lessened thermal cooling requirements.

WPT allows for automatic charging, without the need for charging station attendants or the driver, or a passenger, to dismount and plug in a charging cable. Use of modular charging stations (where the ground installation includes several, geometrically arranged inductive coil assemblies) allows EVs with matching modular coil assemblies to charge in parallel using multiple inductive links. A position indicator can also be useful in cases where the EV stops short, overruns the charger, or stops in a skewed position relative to the charger to show corrective actions needed.

As the electric vehicle (EV) fleet grows in number and the percentage of driver assisted and driverless (fully autonomous) increases, the need for automatic charging of rechargeable energy storage systems (e.g., chemical battery, solid-state battery, capacitive, reversible fuel cell) will similarly increase. The convenience, safety, reliability, and fully automated nature of wireless inductive charging are expected to only increase in value as the power needed for the seemingly insatiable need for reduction in charging session duration and increase in range per charging session is met with efficient, high-power chargers.

In sample configurations described herein, a position offset between a primary coil and a secondary coil of an inductive power transfer pair is determined using a region classifier model and an absolute position model of an operational charging region between the primary coil and the secondary coil. During operation, radio signal information including magnitudes and phase differences is collected from respective radio receivers of a ground transceiver assembly and a vehicle transceiver assembly. The radio signal information and the region classifier model are used to determine whether the vehicle has entered or departed the operational charging region, and the radio signal information and absolute position model are used to determine absolute or relative offset positions of boresights of the primary coil and the secondary coil. A display provides an indication of the absolute or relative offset positions between the boresights of the primary coil and the secondary coil. Further details will be provided below with respect to the respective configurations.

FIG. 1

FIG. 1 is a perspective view of an exemplary antenna layout 101 enabling alignment of the WPT primary and secondary coils across an airgap of a sample wireless power transfer (WPT) system. The underside of the secondary coil assembly 102 is shown with the central near-field transmission antenna 103 and a first pair of inductive loop receiver antennas 104, 105 positioned on the right and left sides of the secondary coil assembly 102. The placement of inductive loop receiver antennas 104, 105 is exemplary with the described configuration designed to allow the secondary module to be affixed under a vehicle chassis.

In this example, the topside of primary coil assembly 107 is shown below the secondary coil assembly 102, aligned along a common axis 106.

The primary coil assembly 107 upper side supports a central transmission antenna 108 and two inductive loop receiver antennas 109, 110 positioned to the front and back of the assembly 107, respectively. For both the primary coil assembly 107 and the secondary coil assembly 102, an operational region 111 with a defined area around the common axis 106 is defined.

It is noted that the magnetic circuit formed by the primary and secondary is reversable and that in a suitably equipped, bi-directional inductively coupled WPT system, power transfer can be reversed. It is also noted that the symmetrical sizes of the coil assemblies 102, 107 are exemplary and are not a requirement.

FIG. 2

Figure 2:
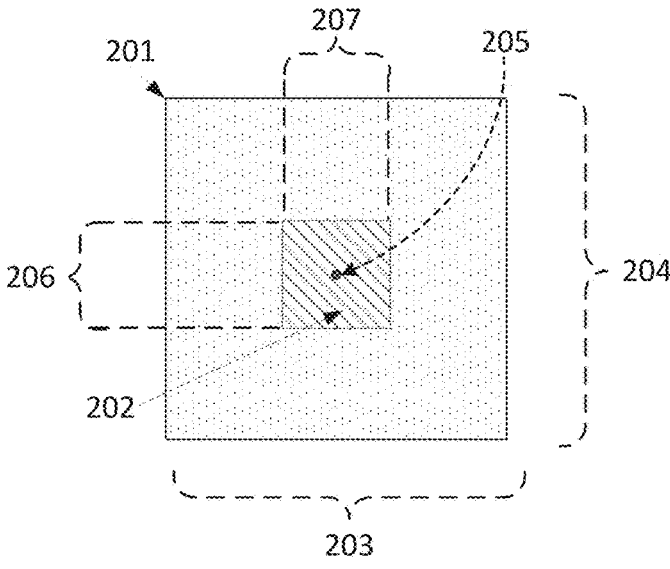
FIG. 2 is a top-down planar view of a ground coil assembly top surface having a defined operational region.

FIG. 2 is a top-down planar view of a ground coil assembly top surface 201 having a defined operational region 202. In the FIG. 2 example, the ground coil assembly surface 201 is rectangular as defined with a width 203 and a length 204. The coil's boresight 205 is surrounded by the operational region 202 defined here as a rectangle of length 206 and width 207.

It is noted that size and shape of the coil assembly 201 may vary dependent on design preferences such as using square, rectangular, or circular coils to generate and receive the magnetic flux needed for inductively coupled power transfer. The operational region 202 similarly may be defined as a polygon (e.g., square, rectangular, circular) area. The area of the operational region is nominally limited by the quiet zone formed by the distance from the coil assembly edges and the amount and area of underlaying backing core material (e.g. ferrite). In the quiet zone, potentially interfering, co-channel signals are attenuated.

Since the operational region 202 is defined for both the ground and vehicle assemblies using measurements taken using the antennas of the ground and vehicle assemblies, to compute the positioning within the operational region 202, the operational region 202 can be visualized using only the ground-side assembly surface 201.

FIG. 3

Figures 3, 4:
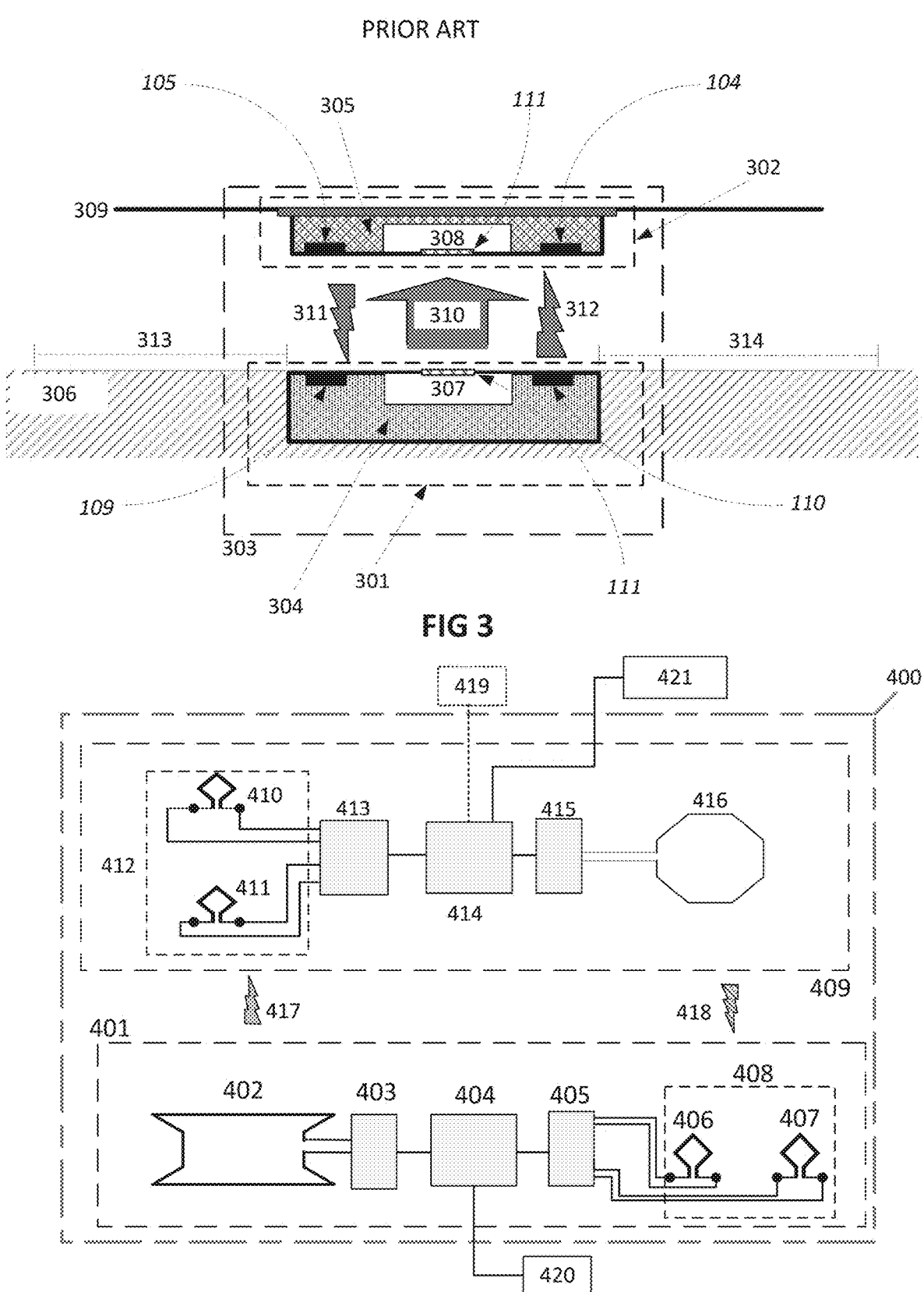
FIG. 3 is a side view of a wireless power transfer system showing the wireless charging and communications signals with signal ranges used in automatic wireless charging at a ground mounted ground transfer system (GTS) that is aligned and paired with a vehicle mounted vehicle transfer system (VTS) to form a GTS/VTS pairing in a sample configuration.
FIG. 4 is a block diagram of a functional subsystem view of a full duplex inductive communications system in a sample configuration.

Since a modular WPT system may be comprised of a charging station with single or multiple coils assemblies per station and the station may support bi-directional charging capabilities, the term Ground Transceiver Station (GTS) will be used for the WPT charger in FIG. 3. The GTS is comprised of one or more Ground Transceiver Assemblies (GTAs) geometrically placed to match the corresponding Vehicle Transceiver Station (VTS) having one-or-more Vehicle Transceiver Assemblies (VTAs). A unidirectional (ground-to-vehicle) scalable, modular wireless charger would also make use of the same communications system as described in FIG. 3.

FIG. 3 is a side view of a wireless power transfer system showing the wireless charging and communications signals with signal ranges used in automatic wireless charging at a ground mounted ground transfer system (GTS) 301 that is aligned and paired with a vehicle mounted vehicle transfer system (VTS) 302 to form a GTS/VTS pairing 303 in a sample configuration. In FIG. 3, the GTS 301 is comprised of a single GTA 304 and the VTS 302 is comprised of a single VTA 305 which form a single inductively coupled pair 303 for the purposes of clarity.

For automatic charging, the GTS 301 shown here is embedded to be flush with the surface of pavement 306. The GTA power-transfer coil 307 must be well-aligned with the Vehicle Transceiver Assembly VTA power-transfer coil 308 and the GTS 301 must be in communication with the VTS 302 both prior to and during charging. In this example, the Vehicle Transceiver Station (VTS) 302 is mounted on the underside of the electric vehicle chassis 309. Each VTA 302 and GTA 304 must be aligned and paired within a predetermined or predictive boresight offset threshold before charging can be initiated.

Before the charging signal 310 can be initiated, reverse link 311 and forward link 312 data paths are established as described, for example, in U.S. Pat. No. 10,826,565 entitled "Near field, full duplex data link for resonant induction wireless charging," incorporated herein by reference. The inductive communication links 311, 312 are power limited with symmetric approach range 313 and departure range 314 both exceeding the size of the GTA 304 (approximately 500 millimeters in size in an operative example, so 500-750 mm in range). Additional information on related alignment processes can be found in U.S. Pat. No. 10,814,729, entitled "Method and apparatus for the alignment of a vehicle and charging coil prior to wireless charging;" U.S. Pat. No. 10,193,400 entitled "Method of and apparatus for detecting coil alignment error in wireless inductive power transmission;" and U.S. Pat. No. 10,040,360 entitled "Method and apparatus for the alignment of vehicles prior to wireless charging including a transmission line that leaks a signal for alignment," the contents of which are incorporated herein by reference.

In a modular GTS 301, each of the single (or multiple) GTA and VTA pairs 303 communicate independently. This independent communication allows for fastest alerting in case of a fault condition and removes the need for inter-GTA (and inter-VTA) communication.

Other configurations of communication between the VTS 302 and GTS 301 may include alternative or supplemental short range local area wireless networking technologies (e.g., Bluetooth, Zigbee, Wi-Fi) or longer range Wireless wide area network (WWAN) technologies (e.g., cellular technology such as LTE, 4G, 5G or 5G-advanced; "Connected Car" wireless packet data networking; satellite-based uplink/downlink technologies). However, it will be appreciated that the short-range, near-field full duplex communications system as shown in FIG. 3 enables more than just communications.

Immediately prior to, during, and immediately following a wireless charging session, the duplex, low latency, near field data link 311, 312 controls a resonant induction, wireless power transfer system for recharging EVs.

As appropriate, the transmit/receive system of the GTA and VTA pair 303 is adjusted to be of the same type (e.g., modulation, data transfer protocol) to enable communication of charging management and control data between the GTA 304 and the VTA 305 during charging.

FIG. 4

FIG. 4 is a block diagram of a functional subsystem view of a full duplex inductive communications system 400 in a sample configuration. The ground charger communications system 401 includes an inductive transmit antenna 402 and a transmission radio subsystem 403. A ground communications controller 404 interfaces the transmission radio subsystem 403 and the ground receiver radio subsystem 405. Ground receiver antenna 406, 407 form a physically separated ground antenna pair 408.

The ground communications controller 404 includes computation, data processing and data storage subsystems to manage data flows in the receive and transmission data streams, and to perform calculations on signal amplitude and phase(s) as received via the ground receiver radio subsystem 405 and first and second ground receiver antenna 406, 407. The first and second ground receiver antenna 406, 407 comprise a first pair 408 of ground receiver antenna allowing for concurrent signal reception and development of a phase difference measurement between the two ground receiver antenna 406, 407.

The ground-based inductive transmit antenna 402 transmits the near-field radio signal 417 (the uplink transmission) which is received concurrently by the vehicle communications system 409 via the first vehicle-based receiver pair 412. The first vehicle receiver pair 412 includes first 410 and second 411 inductive loop antennas which allow concurrent near-field uplink signal 417 reception and development of a phase difference.

The vehicle communications system 409 includes an inductive transmit antenna 416 and a transmission radio subsystem 415. A communications controller 414 interfaces the transmission radio subsystem 415 and the receiver subsystem 413. The vehicle-based inductive transmit antenna 416 transmits the near-field radio signal 418 which is received concurrently by the vehicle communications system 401 via the first receiver pair 408. The first ground-based receiver pair 408 includes first 406 and second 407 inductive loop antennas which allow concurrent near-field downlink signal 418 reception and development of a phase difference.

The vehicle unit communications controller 414 may be linked to a datastore 419 that contains the region classifier model and operational region absolute position model (both described below) for the ground unit and the EV to-be-charged.

The ground communications controller 404 may be linked to datastores 420 outside the charger that may include remote database(s) for storage and retrieval of a charging profile (as described in U.S. Patent Application Publication US 2023/0249559, entitled "Modular Magnetic Flux Control") and/or a magnetics profile (as described U.S. patent application Ser. No. 17/643,764, entitled "Charging Frequency Determination for Wireless Power Transfer") as well as storage for the models (one or more of the region classifier model and the operational region absolute position model) for the ground unit and the EV to-be-charged.

The vehicle unit communications controller 414 also communicates to the vehicular position display 421 for display of the position information developed from the radio signal data and models. In some implementations, the vehicular position display 421 may include information generated by the EV electronics (not shown) or be subsumed into the EV's driving automation systems (also not shown).

While a vehicle position indicator may be most useful in signaling that the vehicle has stopped short or overrun the operational region 111, display of the vehicle position while in motion may be accomplished from multiple positionings. Doppler shift is unlikely to be a source of error at low speed (less than 5 km/sec) approaches for vehicle parking. In some instances, the position indicator may be displayed when the vehicle is stationary or has become stationary at least once during pre-charge alignment.

FIG. 5

Figure 5:
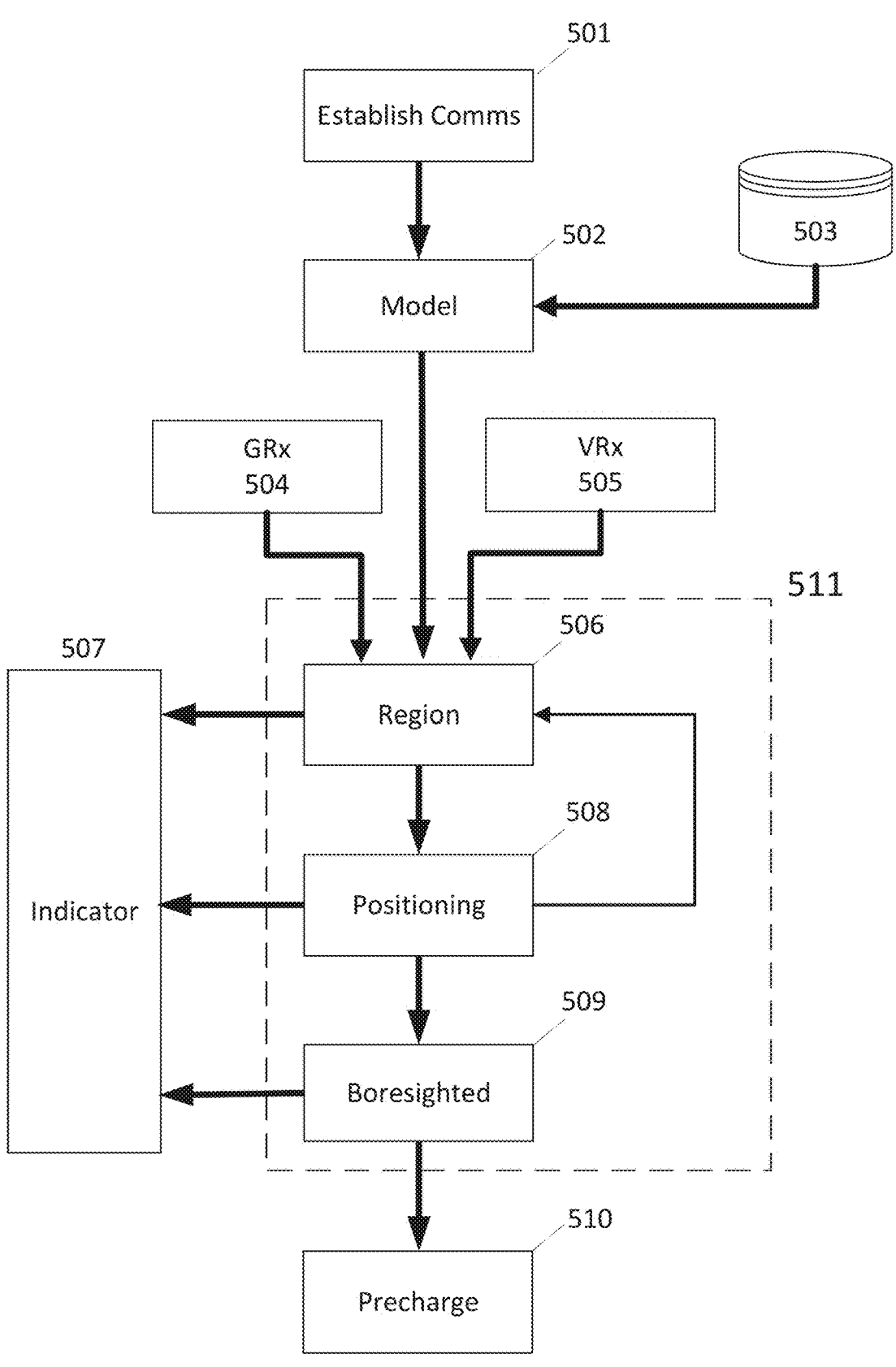
FIG. 5 is a time-oriented view of the methodology for determining the relative offset between the primary and secondary coils of an inductive power transfer pairing in a sample configuration.

FIG. 5 is a time-oriented view of the methodology for determining the relative offset between the primary and secondary coils of an inductive power transfer pairing in a sample configuration.

Establishment of communications 501 between the wireless charging controller of the VTA and wireless charging controller of the GTA is the first step. Nominally this will be using the full duplex inductive communications system but can be supplemented with other means such as short distance Wireless LAN technology or longer-range cellular or satellite radio means. Once duplex communications are established, the model(s) 502 may be obtained. Models can be default or identified (from the vehicle and ground units' electronic serial numbers (ESN)) and uploaded from repository 503.

The repository 503 upload may be implemented in several forms. In some cases, the model (or multiple models) may already be present in the vehicle charging controller's persistent memory. Persistent models may be default or previously uploaded. Different models may be uploaded based on the ESN of the ground assembly or vehicle assembly (this includes modular systems where each member of the modular assembly may require a different model or set of models). Models may vary for the same vehicle based on loadout (nominal vehicle weight with added variable cargo and passenger weights) of the vehicle, direction of approach to the ground charger (pull-in vs back-in) or the ability to change the z-gap by 'kneeling' or otherwise lowering the chassis, and thus the vehicle coil assembly(s), on adaptive suspension. Each model contains two sections, the first a region classifier model ('region' model) and the second the operational region absolute position model ('position' model). In some high ground clearance vehicles, additional models may be needed for movable vehicle coil assemblies that lower to varying extents from the vehicle chassis for charging.

Radio signal information is concurrently collected by the ground-based receivers 504 and the vehicle-based receivers 505 and timestamped. Collection of readings from the near-field communication system's receiver antennas 504, 505 can begin after the model is available. Since the radio links are always-on until post-charge or disengagement from the charger, no specific or special messaging is needed for positioning.

Region detection 506 uses the collected signaling 504 and/or 505 and the region classifier model constructed to alert the alignment system that the operational region has been entered (or departed). Immediately after region detection, the operational region absolute position model can be invoked and then signaling to an indicator 507 can commence showing that the operational region has been entered.

Positioning 508 uses the concurrently collected signal readings (magnitude and phase from each pair of receiver antennas 405, 505) and the calculated phase differences to be used to determine the absolute or relative positions of the primary and secondary boresights. Signal readings may be timestamped to insure concurrent collection in the calculations. The developed position information is used to form the indicator 507. The vehicle operator may use the indicator 507 to adjust the vehicle position as needed to lower the position offset between the primary and secondary boresights. The vehicle operator may be a human, a software system assisted human, or an autonomous driving system. The indicator may be used to display the absolute or relative offset between the primary (ground) and secondary (vehicle) boresights, the direction to minimize the relative offset, or when the vehicle has overrun or otherwise departed the operational region. It is noted that when bi-directional WPT is equipped and activated, the primary and secondary sides are reversed and discharging of the EV battery is enabled. Prior to recalculation of a position, a region detection 506 may be re-performed to determine if the vehicle has departed the operational region.

Boresighting at 509 is when the position offsets between the primary and secondary boresights is zero (or below a predetermined or predictive threshold offset figure). The indicator 507 is updated to display success and the lack of need for any further vehicle adjustments.

Once the vehicle position is established (and acceptable to allow charging) and the vehicle stationary (e.g., in 'park'), the pre-charge 510 operation can begin.

In an operative example, after the full-duplex communication datalinks are established and any pre-alignment data uploads or downloads (e.g., the vehicle-based models for region classifier model and the operational region absolute position model) is accomplished, the signal strengths and phase information (for phase-difference calculation between receiver antenna pairs) from each receiver antenna 504, 505 is collected. It is noted that both the vehicle-based antennas 505 and ground-based antennas 504 are used in signal collection. In one operative example, a direct-sequence spread spectrum (DSSS) uplink and downlink signal collected is always present during pre-charge from the respective ground-based transmitter and vehicle-based transmitters. While PSK DSSS innately allows for signal source identification and signal discrimination, other digital transmission protocols can be used including amplitude, frequency, and phase shift keying, either as wideband or narrowband modulations.

In one operative example, using a DSSS radio scheme, the receive antenna's I and Q channels are sampled at a multiple of the positioning indicator display rate (e.g., 30 Hz.) In the example of DSSS radio, the chip rate is 61.44 kHz (which denotes a maximum sampling rate of 1 sample per chip). At sampling rates higher than the positioning indicator display rate, averaging of the collected samples can be performed for the sampled data. For phase difference, averaging would compute the phase difference first and then average the phase differences over the period.

Using the operational region model with the acquired I/Q and phase data sets, the display indicator can show the absolute X and Y position offsets from the boresight, a directional indicator, a last computed position when the vehicle existed in the operational region, or a directional map showing the first computed position and last computed position (the entry and exit) to the operational region.

For the absolute X, Y position, one option for display would be a Cartesian plane map with a boresight at the origin (X=0, Y=0 at the boresight). Using the region classifier model, the Cartesian plane map could be automatically oriented so that the X and Y coordinates are negative if the boresight is passed.

Computation 511 of the region 506, position 508, and boresight 509 may be accomplished using either the ground-based or vehicle-based computational resources. Collected, timestamped signal data may be transmitted over the near-field (or alternative) wireless link as needed.

FIG. 6A

Figure 6A:
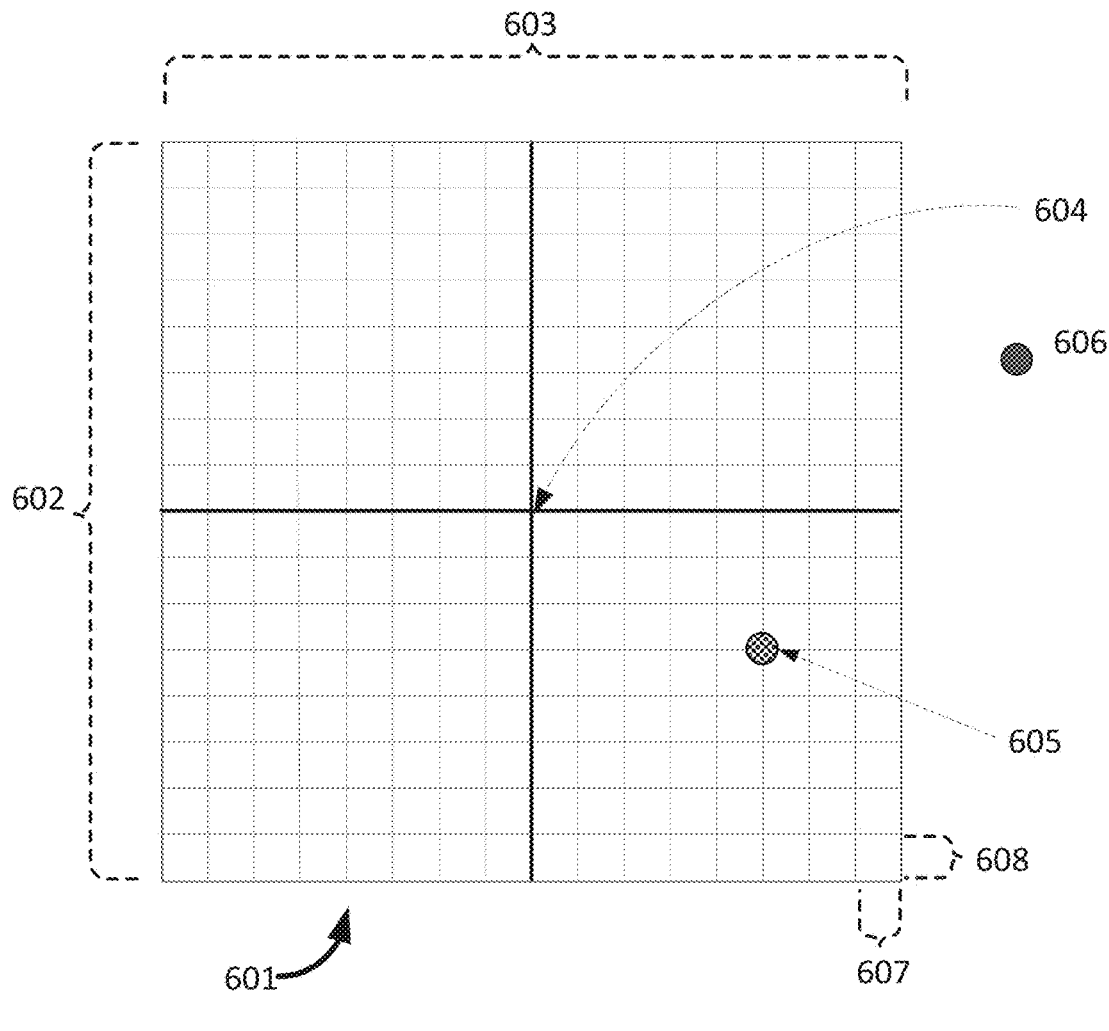
FIG. 6A is a graph illustrating the structure of a region classifier model and an operational region absolute position model used for alignment via the near field communications system uplink and downlink signal readings of multiple receiver antenna pairs in a sample configuration.

FIG. 6A is a graph illustrating the structure of a region classifier model and an operational region absolute position model used for alignment via the near field communications system uplink and downlink signal readings of multiple receiver antenna pairs in a sample configuration. While the operational region can be set to any generic polygon shape, and the coil may be square, circular or rectangular, the square operational region 601 depicted allows for ease in depiction.

The operational region 601 can be depicted as a region around the ground-based transmission antenna boresight. During model training, the vehicle-based WPT with associated communications antennas is moved over the region, creating a grid of readings with each vertex having four uplink received signal strengths (I and Q for both antennas in the receiver pair) and an uplink signal phase difference. Each vertex will similarly also have four downlink received signal strengths and a computed downlink phase difference with all signal measurements taken concurrently and transmitted over the communications link for processing at either the ground or vehicle alignment computation subsystem. The granularity of the grid across the operational region 601 is set by the step size selected for the training system resulting in a consistent grid size of length 608 and height 609. The grid size must be larger than the error in positional measurement. Measurements taken between vertices use interpolation to estimate position to the nearest vertex.

The Cartesian coordinate system with the x-axis 602 and y-axis 603 is used to map measurements during the training phase. The origin 604 of the Cartesian coordinate system (x=0, y=0) is centered in the operational region 601 in this example.

When the models are fully trained and functioning, the current calculated position 605 within the operational region 601 may be graphically displayed or passed to other applications as a cartesian coordinate (here 5,−3). The region classifier model cannot identify a wayward point 606 as being in the operational region 601 and thus its position is not calculated.

The region model is implemented as a single model classifier. For a given classifier, there are six input nodes, comprising the four magnitudes and the two phase differences obtained from the receive antenna. The output indicates if the inputs are from inside or outside the region. In one implementation, a multilayer perceptron is used, wherein there is one or more hidden layers with some number of hidden nodes M, N, . . . and a Tanh or other suitable activation function. The number of hidden nodes is typically on the order of 10 and the number of hidden nodes M, N, . . . do not have to be equal. The multilayer perceptron weights are optimized during training and can then be stored in a vector for use in classification. The weights are the only data objects that need to be uploaded or downloaded from a server, while the structure of the machine learning model can be fixed for all units.

The absolute position model is implemented as two single-variable regressors, one for each axis of the Cartesian grid. For a given regressor, there are six input nodes, comprising the four magnitudes and two phase differences obtained from the radios. In one implementation, a multilayer perceptron is used, wherein there is a hidden layer with some number of hidden nodes M and a tanh or logistic activation function, or similar. The number of hidden nodes is typically on the order of 10. The multilayer perceptron weights are optimized during training and can then be stored in a vector for use in regression. The weights are the only data objects that need to be uploaded or downloaded from a server, while the structure of the machine learning model can be fixed for all units.

To develop the training data used in constructing the region model a paired set of a vehicle assembly and a ground assembly are moved in a regular pattern so that measurements may be taken in a grid pattern over the entire operational area 601. The collected, time-stamped measurements are used to train the region model and absolute position model. Multiple models, using differing ground or vehicle assemblies and thus training data, may be needed due to heterogenous WPT deployments.

FIG. 6B

Figure 6B:
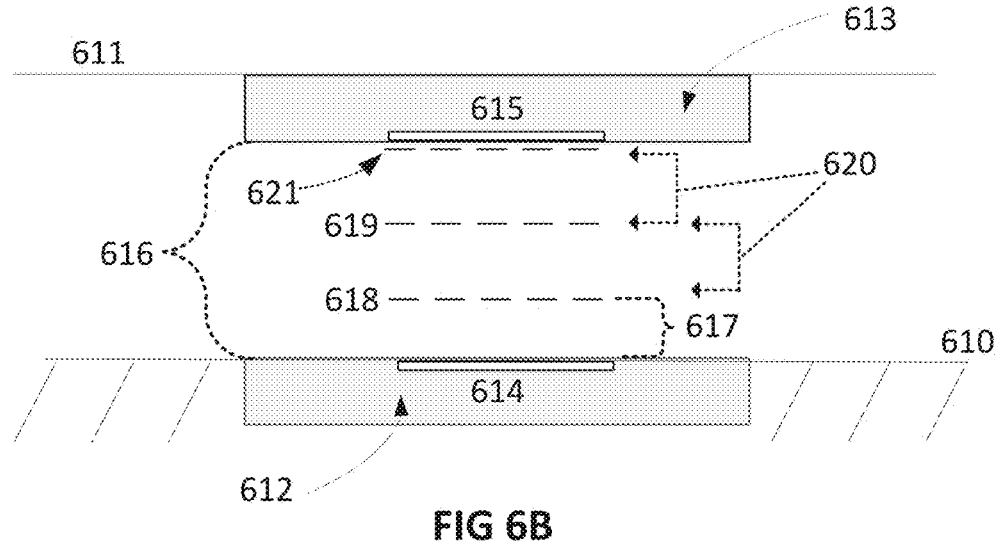
FIG. 6B is a simplified side view of the space between the road surface and the vehicle undercarriage including the WPT system of a sample configuration.

FIG. 6B is a simplified side view of the space between the road surface 610 and the vehicle undercarriage 611 including the WPT system of a sample configuration.

The ground assembly 612 is installed flush with the road surface 610 while the vehicle assembly 613 is shown as attached to the vehicle undercarriage 611. The ground-side operational region 614 and the vehicle operational region 615 are shown as symmetric in size.

The air-gap 616 between the ground assembly 612 and the vehicle assembly 613 may vary due to vehicle make, model, manufacturer and current loading. A minimum coil separation distance 617 set by the WPT system designer is expected to prevent overcoupling between the primary and secondary coils.

This this example, a first 618 and second 619 scan (where a paired set of a vehicle assembly and a ground assembly are moved in a regular pattern so that measurements may be taken in a grid pattern over the entire operational area) at various altitudes (a layer) are used to create a three-dimensional matrix of bins having different layers 620. Additional scans 621 may be needed for high undercarriage vehicles or vehicles with adaptive ground clearance. The collected, time-stamped measurements are used to train the region model and absolute position model resulting in 2 models per scanned layer.

FIGS. 7A-9B

FIGS. 7A-7B, 8A-8B, and 9A-9B are used to show the consistent and asymmetric receiver patterns that enable the alignment and verification system described herein. These received signal readings are used as part of the training sequence for the operational region edge detection and region models. Both signal magnitude and phase received of the near-field signaling are collected at each receiver antenna for each sample point. Since the near-field communications system is full duplex, signal collection can be performed concurrently for each unit, whether it is ground or vehicle-based.

FIG. 7A illustrates the received signal strength of the near-field transmission from the vehicle-mounted transmitter at a first ground-unit receiver antenna. These readings are taken over a tested region 701 that includes the entire selected operational region plus a perimeter so that the readings from the two separate ground-side receiver antennas can be overlaid. These readings are used as part of the training sequence for the operational region edge detection and region models. As can be seen from the isolines 702, the received signal strength varies over the tested region 701.

FIG. 7B illustrates the received signal strength of the near-field transmission from the vehicle-mounted transmitter at a separate but co-planar second ground-unit receiver antenna. Sampling is performed so that the tested region 701 from the first receiver and the tested region 703 derived from the second receiver can be overlaid. The isoline patterns 704 developed from the readings taken by the second receiver are both asymmetric and differ from those taken with the first receiver.

FIG. 8A illustrates the received signal strength of the near-field transmission from the ground-mounted transmitter at a first vehicle-based receiver antenna. These readings are taken over a tested region 801 that includes the entire selected operational region plus a perimeter so that the readings from the two separate vehicle-side receiver antennas can be overlaid. These radio signal strength readings are used as part of the training sequence for the operational region edge detection and region models. As can be seen from the isolines 802, the received signal strength varies over the tested region 801 with considerable asymmetry.

FIG. 8B illustrates a signal strength map over a tested region 803 as created from readings from a second vehicle-based receiver antenna. These readings are taken over a tested region 803 that includes the entire selected operational region plus a perimeter so that the readings from the two separate but co-planar second vehicle-side receiver antenna can be overlaid. The isoline patterns 804 developed from the readings taken by the second vehicle-based receiver are both asymmetric and differ from those taken with the first vehicle-based receiver.

The up (ground-to-vehicle) and down (vehicle-to-ground) transmissions include signal strength with in-phase and quadrature components that can be measured at the corresponding receiver antennas. With two receiver antennas deployed on each plane (vehicle-unit and ground-unit) the phase difference can be developed for each transmission received.

Figure 9A:
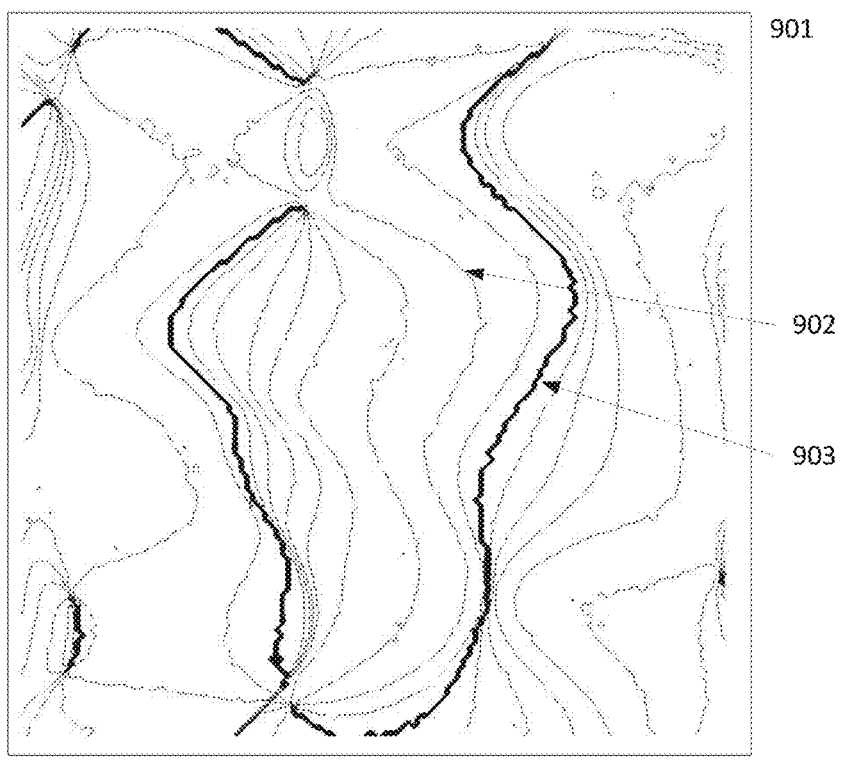
FIG. 9A illustrates the phase difference between the uplink transmission as received at the vehicle-based receiver antennas over a tested region.

FIG. 9A illustrates a phase difference between the uplink transmission as received at the vehicle-based receiver antennas over a tested region 901. The isolines 902 show the relative phase differences as measured and derived from the received signal. Especially rapid phase changes are shown by the close-spaced isolines (Nominally around the zero phase difference line 903).

Figure 9B:
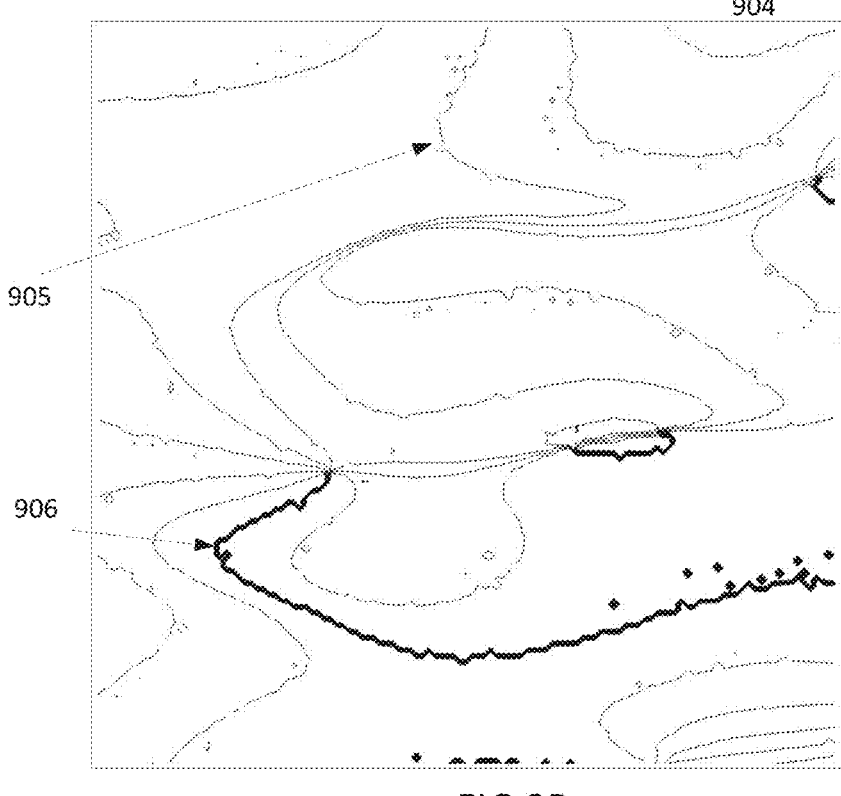
FIG. 9B illustrates the phase difference between the downlink transmission as received at the ground-based receiver antennas over the tested region.

FIG. 9B illustrates the phase difference between the downlink transmission as received at the ground-based receiver antennas over the tested region 904. The isolines 905 shows the relative phase differences as measured and derived from the downlink received signal. The rapid phase difference changes close to the zero (0) phase difference isoline 906 is noted as the individual isolines become indistinguishable.

Figure 10A:
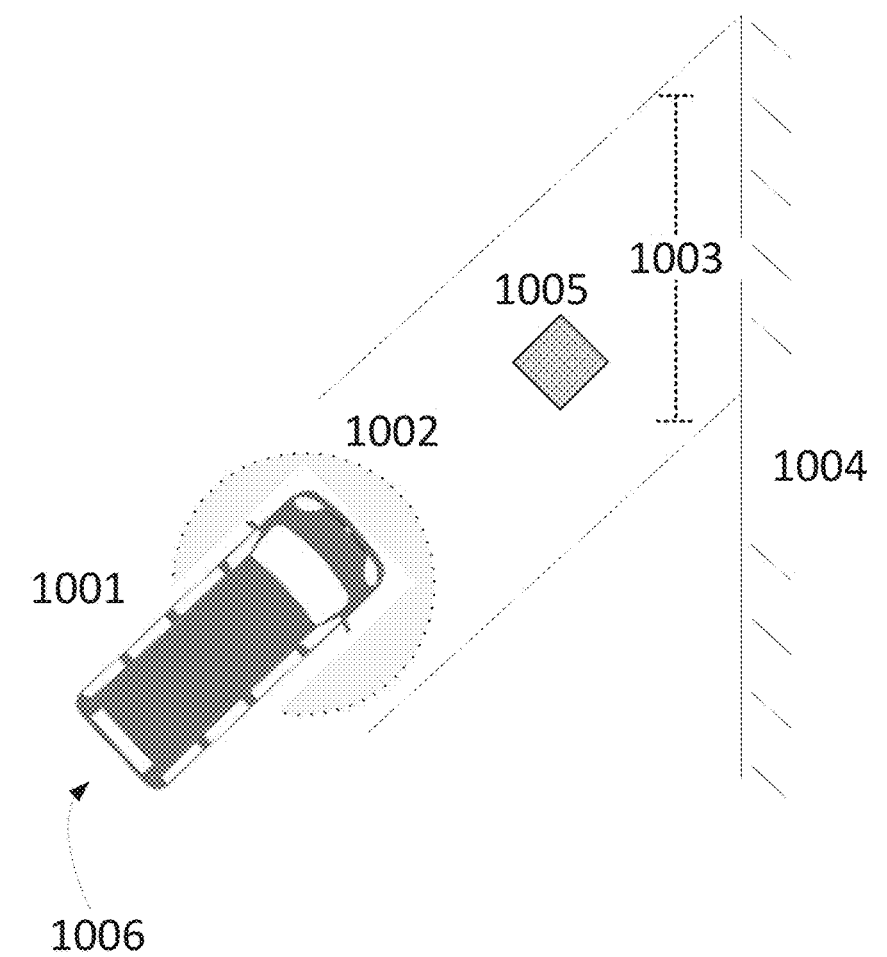
FIG. 10A is a diagram illustrating an electric vehicle (EV) with a useful near-field range that is depicted while the EV approaches a diagonal parking stall equipped with a wireless charger and backed by a curb.
Figure 10B:
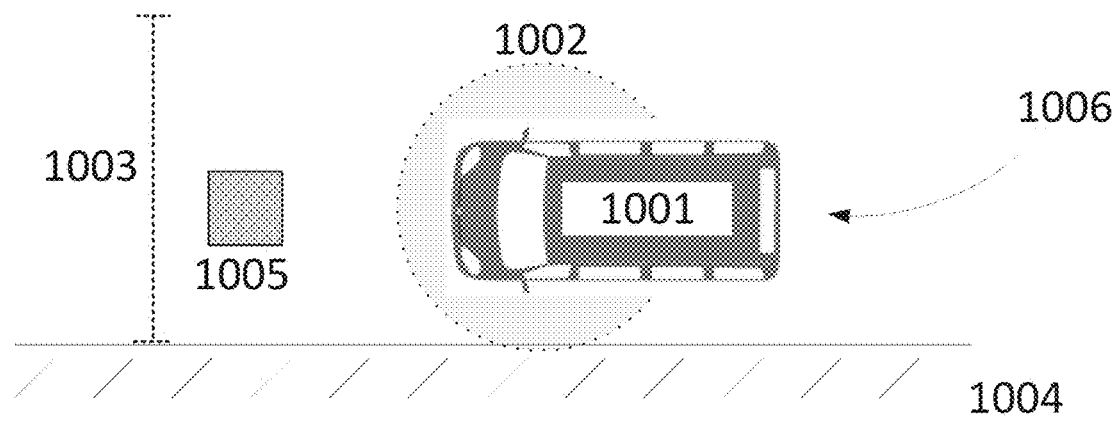
FIG. 10B is a diagram illustrating an EV with a useful near-field range that is depicted while the EV approaches a parallel parking stall equipped with a wireless charger.

In a WPT system designed to wirelessly charge electric vehicles, the ability to specify an operational region around both the vehicle coil boresight and the ground coil boresight for any primary and secondary coil pair allows for positioning for arbitrary vehicle approaches. FIGS. 10A and 10B detail common vehicle approaches to a charging station containing one or more wireless chargers (a.k.a. ground-units, ground assemblies, or primary coil assemblies). The technique of having an operational region with a defining perimeter for alignment and position verification allows for multiple approaches and flexibility in EV design and adaptation to wireless automatic charging.

FIG. 10A

FIG. 10A is a diagram illustrating an electric vehicle (EV) 1001 with a useful near-field range 1002 that is depicted while the EV 1001 approaches a diagonal parking stall 1003 equipped with a wireless charger 1005 and backed by a curb 1004. The diagonal parking stall 1003, denoted by lane markings and the curb 1004, is equipped with a wireless charger 1005. As designed, the near-field range 1002 approximates the parking stall width 1003. The approach vector 1006 is shown as the vehicle proceeds from the travel lane into the parking stall 1003 and onto the wireless charger 1005.

As shown in FIG. 10A, the vehicle-mounted coil is located to the front of the vehicle, nominally behind the front axle. Although advantageous for protecting the coil assembly(s), this placement is a designer's preference based on the vehicle and parking preferences of the vehicle's market. In some markets, and with the advent of back-up cameras, parking may include backing into a parking stall 1003. Wireless chargers 1005 could be located at the entry of the parking stall 1003 or the vehicle-mounted secondary could be mounted to the rear of the vehicle 1001 as to better prevent the wireless charger 1005 from necessarily, temporarily bearing a portion of the electric vehicle's weight before and after each charging session.

The technique of having an operational region with a defining perimeter allows for back-and-forth parking approach flexibility in EV design and in accordance with local parking practices. The same technique also allows a wide-range of angled approaches to accommodate parking stall angles and curb-side parking for wireless charging.

FIG. 10B

FIG. 10B is a diagram illustrating an EV 1001 with a useful near-field range 1002 that is depicted while the EV 1001 approaches a parallel parking stall 1003 equipped with a wireless charger 1005. The wireless charger 1005 is placed along a curb 1004. The approach 1006 allows for positioning using the near-field range 1002 of the wireless communications system as the EV 1001 nears the charger 1005.

FIG. 10C

Figure 10C:
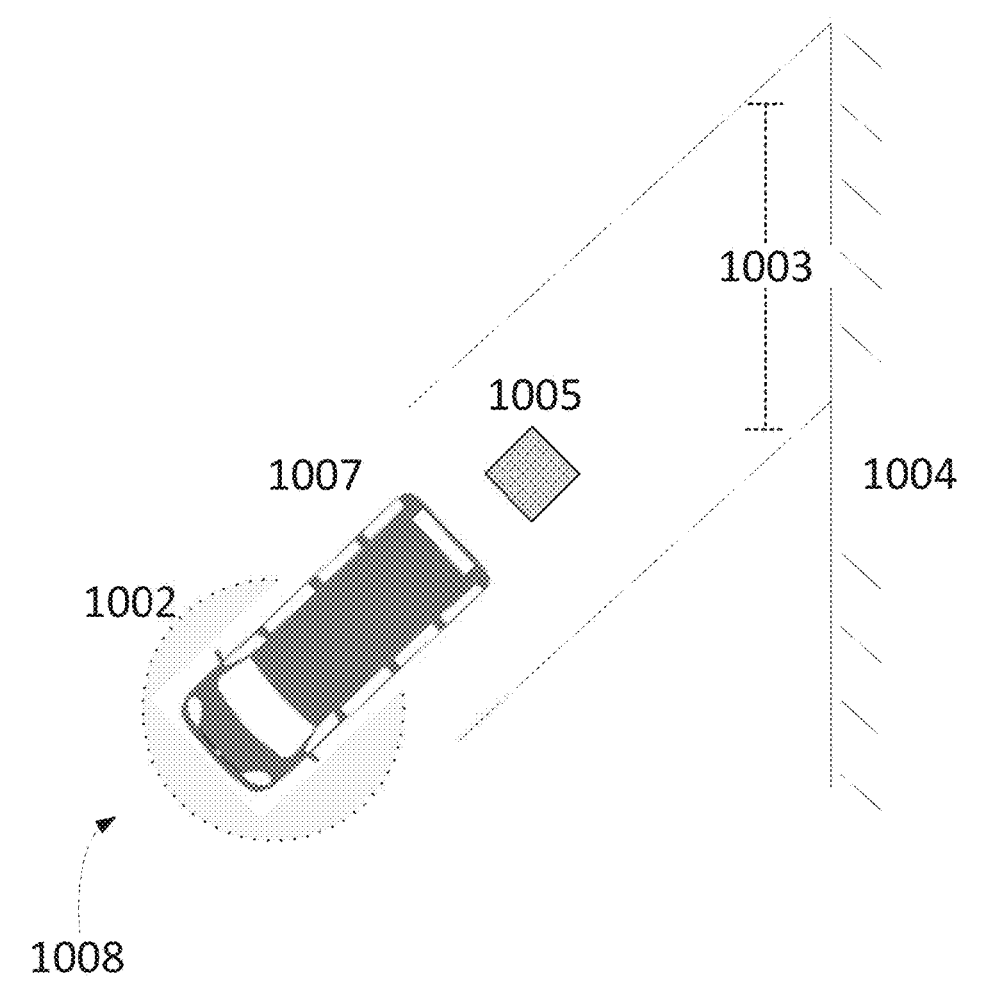
FIG. 10C is a diagram illustrating an EV with a useful near-field range that is depicted while the EV backs into a diagonal parking stall equipped with a wireless charger and backed by a curb.

FIG. 10C is a diagram illustrating an EV 1007 with a useful near-field range 1002 that is depicted while the EV 1007 backs 1008 into a diagonal parking stall 1003 equipped with a wireless charger 1005 and backed by a curb 1004. The wireless charger 1005 may be situated to accommodate backing-in, pulling-in, or either approach. In this example, the EV 1007 is equipped with a forwarded mounted vehicle assembly with near-field communications with a range 1002 that extends under the vehicle.

In the FIG. 10C example scenario, the right and left antenna positions are reversed versus the antenna positions in a pull in approach, and a second set of models is used to provide positioning. In non-integrated WPT systems, the ground assembly can use signal magnitudes to determine the approach vector. In integrated systems, electrical linkage to the vehicle reverse lights or intra-vehicle messaging (e.g., the CAN bus) can notify the WPT system that the vehicle 1007 is in forward or reverse.

FIG. 10D

Figure 10D:
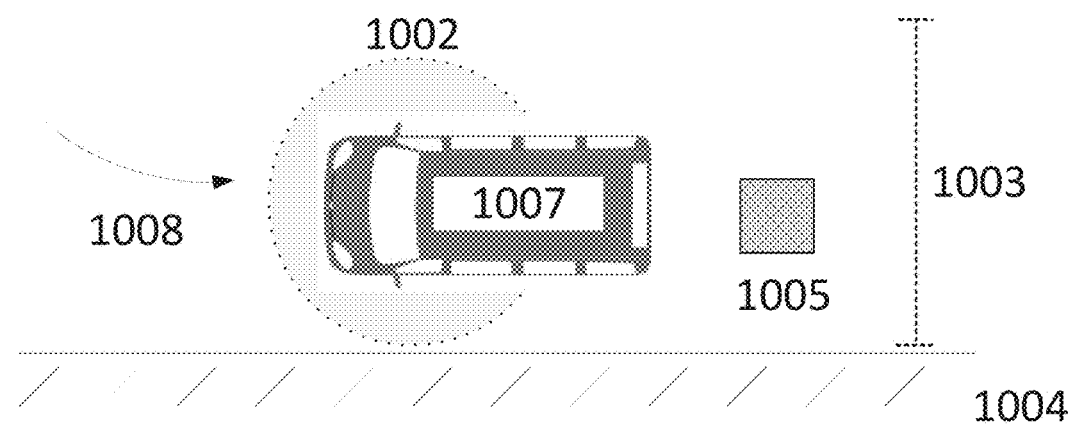
FIG. 10D is a diagram illustrating an EV with a useful near-field range that is depicted while the EV backs into a parallel parking stall equipped with a wireless charger.

FIG. 10D is a diagram illustrating an EV 1007 with a useful near-field range 1002 that is depicted while the EV 1997 backs 1008 into a parallel parking stall 1003 equipped with a wireless charger 1005. The wireless charger 1005 may be situated to accommodate backing-in, pulling-in, or either approach. In this example, the EV 1007 is equipped with a forwarded mounted vehicle assembly with near-field communications with a range 1002 that extends under the vehicle 1007.

In the FIG. 10D example scenario, the right and left antenna positions are not reversed and a second set of models is not needed to provide positioning. Coordination between the ground and vehicle assemblies is required to determine which model set to use based on signal magnitudes to determine the approach vector. In integrated systems, electrical linkage to the vehicle reverse lights or intra-vehicle messaging (e.g., the CAN bus) can notify the WPT system that the vehicle 1007 is in forward or reverse but comparison of signal magnitudes will still be needed.

In an alternative scenario, the WPT system concurrently computes the region using a forward and reverse region classification model. One or more region detections can be used to select the correct model set and then compute position.

FIG. 11

Figure 11:
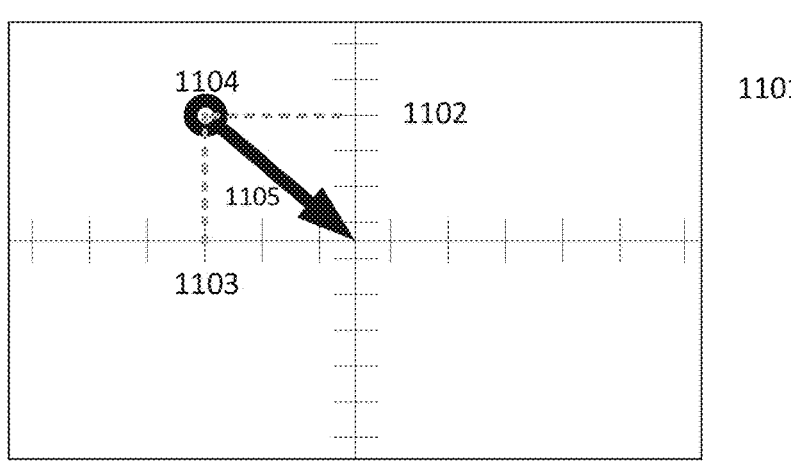
FIG. 11 illustrates an example of a position indication display using a cartesian plot that extends over the operational region.

FIG. 11 illustrates an example of a position indication display 1101 using a cartesian plot that extends over the operational region. In the FIG. 11 example, no integration with the EV systems is required as no information from the vehicle is needed. The position indicator display 1101 shows the x-axis 1102 and the y-axis 113 conforming to the EV layout. The current position 1104 is shown plotted on the coordinate system. An optional arrow 1105 may be shown to direct the driver's attention to the position offset and the correction needed to achieve a boresight-to-boresight alignment.

FIG. 12A

Figure 12A:
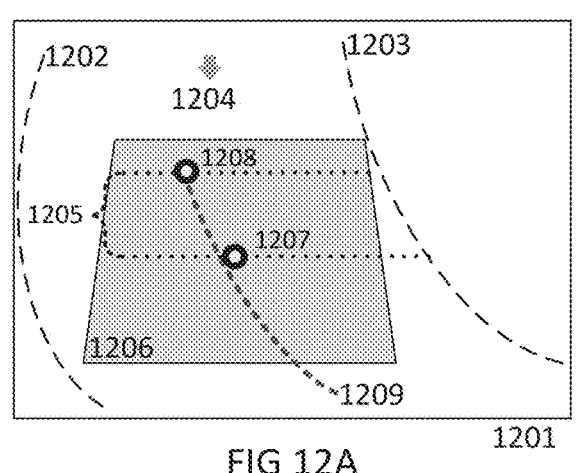
FIG. 12A illustrates an example of a position indication display in which information from the EV is available and is combined with the calculated position.

FIG. 12A illustrates an example of a position indication display 1201 in which information from the EV is available and is combined with the calculated position. In the FIG. 12A example, information from the EV is available (e.g., speed, direction (forward/reverse), angle of steering) and is combined with the position calculated. Using the vehicle provided information, the left 1202 and right 1203 wheel paths can be predicted for the EV moving in the reverse direction 1204.

In this example, the current position 1208 is within the operational region 1206. When the current position 1208 cannot be calculated, the indicator display 1201 may be blank or display wheel tracks 1202, 1203 without current position 1208 or the operational region 1206. The distance between the current position 1208 and the boresight-to-boresight alignment position 1207 can be calculated as the vehicle moves the distance 1205 along the trajectory 1209.

FIG. 12B

Figure 12B:
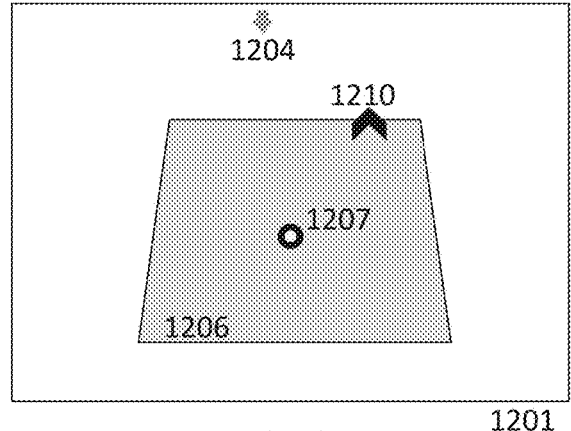
FIG. 12B illustrates an example of a position indication display where the last computed current position within the operational region can be displayed using a unique graphic that denotes the last computed position and the direction of the exit.

FIG. 12B illustrates an example of a position indication display 1201 where the last known current position within the operational region can be displayed using a unique graphic 1210 that denotes the last computed position and direction of the exit. In the FIG. 12B example, information from the EV is available (e.g., speed, direction (forward/ reverse), angle of steering) and could be provided with the current position when available. In the FIG. 12B depiction, the current position was calculated within the operational region 1206 but the vehicles subsequently exited the operational region 1206. In this case, the last known current position within the operational region 1206 can be displayed using a unique graphic 1210, preferably one that denotes the direction of the exit.

Once the current position can be calculated (i.e., once the current position enters the operational region) then additional visual information on wheel tracks, distance from and track toward the boresight-to-boresight alignment point 1207 can be calculated and displayed.

FIG. 13

Figure 13:
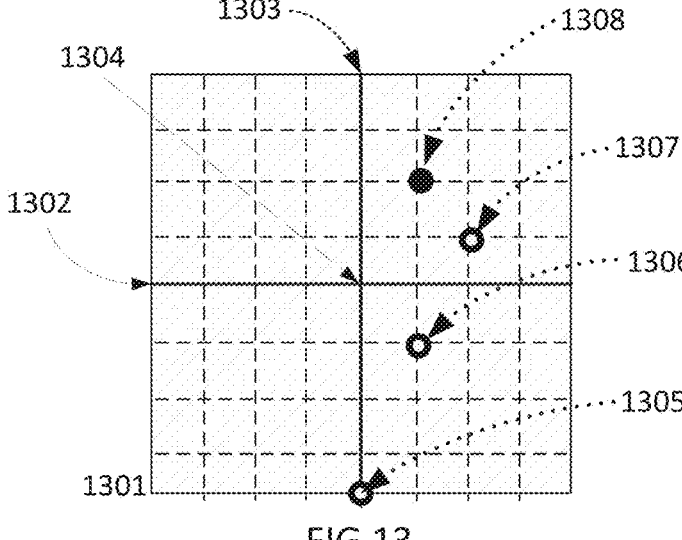
FIG. 13 illustrates an example of a position indication display where the position indication has been incorporated with the software of an autonomous driving system and a descriptive visualization of the operational region is presented.

FIG. 13 illustrates an example of a position indication display where the position indication has been incorporated with the software of an autonomous driving system of an autonomous vehicle and a descriptive visualization of the operational region 1301 is presented. For convenience, the operational region 1301 is portrayed as a Cartesian coordinate system with axes 1302, 1303 and interaction point (origin) 1304. It is noted that other coordinate systems (e.g., radial with angle and distance from boresight) can be used with translated coordinates.

Once the operational region 1301 has been entered by the autonomous vehicle, the positioning system sends absolute coordinates to the autonomous driving system of the autonomous vehicle showing the current position 1305 of the autonomous vehicle for purposes of improving autonomous alignment of the autonomous vehicle for charging or discharging. The current position of the autonomous vehicle is adjusted over time with the entire sequence of first 1305, second 1306, third 1307, fourth 1308 succeeding positionings of the autonomous vehicle until the absolute or relative offset between the boresights of the primary coil and the secondary coil are below a predictive threshold based on at least one of power level requested, magnetic flux leakage allowed, efficiency thresholds, coupling factors, predicted charging or discharging time, or thermal estimates for each GTA (e.g., the boresights are aligned at the origin 1304 of the operational charging area 1301) and motion of the autonomous vehicle ceases or the current position is no longer in the operational charging area 1301.

ADDITIONAL EMBODIMENTS

Modular Chargers

In a modular WPT system where the ground charger and vehicle secondaries are paired in a matching geometric fashion, the operational region data from the pair can be combined to yield information about the vehicle's position over the modular ground charger. It is noted that examples presented are inline (1×M, were multiple ground-vehicle paired units arranged front to back in a single column) with similar use of positions from 1-n rows (N×M) of side-by-side ground-vehicle paired units.

FIG. 14

FIG. 14 is a diagram illustrating an example vehicle positioning where the vehicle-side first 1401 and second 1402 operational regions (corresponding to a 1×2 modular in-line WPT system) are slightly offset with corresponding ground-side first 1403 and second 1404 operational regions. The vehicle assemblies and thus the vehicle-side first 1401 and second 1402 operational regions are each spaced on a common axis 1407 (which is nominally the centerline of the vehicle chassis). The ground-side assemblies and thus the ground-side first 1403 and second 1404 operational regions are spaced on a common axis 1408 (nominally corresponding to the centerline of the charging stall or lane).

Although offset, a first mutual operational area 1405 and a second mutual operational area 1406 allow for calculations of two positions, one for each of the vehicle-side first 1401 and second 1402 operational regions. These calculated positions then allow for the side-to-side offset 1410 and the front-to-back offset 1409 to be computed and a position indication delivered. In some cases, when the position offsets are below a predetermined threshold, charging or discharging may be initiated. These cases are based on power level requested, magnetic flux leakage allowed, efficiency thresholds, predicted charging or discharging time, and thermal estimates.

FIG. 15

FIG. 15 is a diagram illustrating an example vehicle positioning where the vehicle-side first 1501 and second 1502 operational regions (corresponding to a 1×2 modular in-line WPT system) are badly positioned relative to corresponding ground-side first 1503 and second 1504 operational regions. The vehicle assemblies and thus the vehicle-side first 1501 and second 1502 operational regions are each spaced on a common axis 1506 (which is nominally the centerline of the vehicle chassis). The ground-side assemblies and thus the ground-side first 1503 and second 1504 operational regions are spaced on a common axis 1507 (nominally corresponding to the centerline of the charging stall or lane).

A single mutual operational area 1505 exists in the FIG. 15 example due to overlap of the first vehicle-side operational region 1501 and the first ground-side operational region 1503. While a position based on the first mutual operational region 1505 can be calculated, no additional information can be developed for the badly positioned vehicle with the angular error 1508.

FIG. 16

FIG. 16 is a diagram illustrating an example vehicle positioning where the vehicle-side first 1601 and second 1602 operational regions (corresponding to a 1×2 modular in-line WPT system) are slightly angularly offset with corresponding ground-side first 1603 and second 1604 operational regions. The vehicle assemblies and thus the vehicle-side first 1601 and second 1602 operational regions are each spaced on a common axis 1605 (which is nominally the centerline of the vehicle chassis). The ground-side assemblies and thus the ground-side first 1603 and second 1604 operational regions are spaced on a common axis 1606 (nominally corresponding to the centerline of the charging stall or lane).

With a first mutual operational area 1607 and a second mutual operational area 1608, a position offset (from each respective boresight) based on each mutual operational area 1607, 1608 can be calculated for the badly positioned vehicle with the angular error 1609. Position indications and corrective measures may be displayed or charging or discharging may be initiated when the position offsets are below a predetermined threshold. These predictive thresholds are based on power level requested, magnetic flux leakage allowed, efficiency thresholds, coupling factor(s), predicted charging or discharging time, and thermal estimates for each ground assembly (e.g., a GTA) and active group of ground assemblies (e.g., a GTS).

FIG. 17

The placement of inductive loop receiver antennas can affect hardware costs, vehicle weight, non-communication functionality, time-to-position, and communications system complexity.

FIG. 17 is a diagram depicting the topside of a ground assembly 1701 and the underside of a vehicle assembly 1702 immediately prior to alignment along a first direction of travel relative to the ground assembly. The ground assembly has a first 1703 and second 1704 inductive receive antenna arranged along the axis of travel 1705. An inductive transmitter antenna 1706 is included centered on the ground assembly 1701.

A first 1707 and second 1708 vehicle assembly based inductive receiver antenna are located on the vehicle assembly 1702 perimeter, to either side of the axis of travel 1705. The vehicle assembly transmission antenna 1709 is centrally located on the vehicle assembly 1702.

The ground assembly receiver antenna 1703, 1704 are situated as to be orthogonal to the vehicle assembly antennas 1707, 1708, allowing calculation of X and Y position using the region classifier and operational region absolute positioning model as previously described with respect to FIG. 5.

The ground-based receiver antenna 1703, 1704 arrangement shown here allows for determination of the direction of travel based on measured signal strength at the ground assembly while following an antenna guideline is enabled using the two laterally mounted vehicle-side receive antennas 1707, 1708.

FIG. 18

FIG. 18 is a diagram depicting the topside of a ground assembly 1801 and the underside of a vehicle assembly 1802 immediately prior to alignment along a second direction of travel 1805 relative to the ground assembly. The ground assembly has a first 1803 and second 1804 inductive receive antenna arranged transverse to the axis of travel 1805. An inductive transmitter antenna 1806 is included, centered on the ground assembly 1801.

A first 1807 and second 1808 vehicle assembly based inductive receiver antenna are located on the vehicle assembly underside 1802 perimeter, along the axis of travel 1805. The vehicle assembly transmission antenna 1809 is centrally located on the vehicle assembly underside 1802.

The ground assembly receiver antennas 1803, 1804 are situated as to be orthogonal to the vehicle assembly antennas 1807, 1808, allowing calculation of X and Y position using the region classifier and operational region absolute positioning model as previously described with respect to FIG. 5.

The vehicle-based receiver antennas 1807, 1808 arrangement shown here allows for determination of the direction of travel based on measured signal strength using the two transversely mounted antennas 1807, 1808.

FIG. 19

FIG. 19 is a diagram depicting an alternative receiver antenna structure for a ground assembly where the topside of the ground assembly 1901 and the underside of a vehicle assembly 1902 immediately prior to alignment are shown. The ground assembly topside 1901 has a pair of receive antennas 1903, 1904 and a central transmission antenna 1905. The receive antenna 1903, 1904 are mounted transverse to the axis of travel 1906.

The vehicle assembly underside 1902 has a centrally located transmission antenna 1907, a first pair of receive antennas 1908, 1909, and a second pair of receive antennas 1910, 1911. The first pair of receive antennas 1908, 1909 are mounted outside the centrally located transmission antenna 1907 and transverse to the axis of travel 1906. The second pair of inductive receive antennas 1910, 1911 are mounted outside the central loop transmission antenna 1907 and are lateral to the axis of travel 1906.

Using the arrangement of inductive communications antennas in FIG. 19, the ground-based receiver antennas 1903, 1904 are sufficient to communicate and determine the direction of approach based on signal strength magnitude. Using the signal data derived from the vehicle-assembly receive transverse antenna pairs 1908, 1909, the direction of approach can be determined. Using the vehicle-assembly receive lateral antenna pair 1910, 1911, a guideline antenna may be followed for alignment described, for example, in commonly owned U.S. Patent Publication No. 2022/0126710 entitled METHOD AND APPARATUS FOR THE SELECTIVE GUIDANCE OF VEHICLES TO A WIRELESS CHARGER. Using all the vehicle-assembly antenna and a specialized set of models trained just on vehicle-assembly received signals, the region classification and positioning within the operation region can be accomplished. The vehicle-assembly antennas first receiver antenna pair 1908, 1909 or the second receiver antenna pair 1910, 1911 also may be used for uplink communications from the ground assembly transmission antenna 1905.

FIG. 20

FIG. 20 is a diagram depicting an alternative receiver antenna structure for a vehicle assembly where the topside of a ground assembly 2001 and the underside of the vehicle assembly 2002 immediately prior to alignment are shown. The ground assembly topside 2001 has a first pair of receive antennas 2003, 2004, a central transmission antenna 2005, and a second pair of inductive receive antennas 2006, 2007. The first pair 2003, 2004 are mounted laterally to the axis of travel 2008 while the second pair are mounted transverse to the axis of travel 2008.

The vehicle assembly underside 2002 has a centrally located transmission antenna 2009 and a single pair of receive antennas 2010, 2111 mounted outside the centrally located transmission antenna 2009 and laterally to the axis of travel 2008.

Using the arrangement of inductive communications antennas in FIG. 20, the direction of approach and the region classification and positioning within the operation region can be accomplished with signals received on the ground-side using models trained with test data for that antenna arrangement. The vehicle-assembly antennas 2010, 2011 could be used for communications, guidewire following and alignment.

The additional cost of antennas, data storage (models) and computational power needed on the ground-side for calculation of the direction of approach, the region classifier, and the operational region absolute positioning model is a fraction of that of deploying additional antenna on the vehicle-side. The minimization of weight on the vehicle side is also a benefit of the FIG. 20 design.

FIG. 21

FIG. 21 is a diagram depicting an alternative receiver antenna structure for a ground assembly 2101 where the topside of the ground assembly 2101 and the underside of a vehicle assembly 2102 immediately prior to alignment are shown. The ground assembly topside 2101 has central transmission antenna 2103 and a first 2104 and second 2105 inductive receive antenna arranged in paired fashion lateral to the axis of travel 2106. Alternately, the first and second receiver antennas 2104, 2105 could be mounted transverse to the axis of travel 2106 since in this embodiment, the ground-side receiver antenna pair 2104, 2105 need not be used for operation region detection or positioning.

The vehicle assembly underside 2102 has a centrally located transmission antenna 2107 and four receive antennas 2108, 2109, 2110, 2111 deployed at the corners of the vehicle assembly underside 2102. The placing of the induct receiver antenna at the corners not only allows maximum spatial distancing, but also allows for virtual pairing. A software-defined radio may be used at the GTA or VTA to selectively create samples from chosen pairs of antennas (2 signal magnitudes and 1 phase difference per pair). By pairing the receive antenna signal data into a front pair 2108, 2110 data and back pair 2109, 2111 data, the received signal magnitude can be used to determine the direction of approach to the ground assembly 2101. Either concurrently or after the direction of travel is established, the virtual antenna pairing could be used to implement a right/left pairing to either side of the axis of travel 2106. The right lateral pair 2109, 2110 and the left lateral pair 2108, 2111 are then available for communications and alignment by determining left/right distances from an antenna guidewire as described in commonly owned U.S. Patent Publication No. 2022/0126710 entitled METHOD AND APPARATUS FOR THE SELECTIVE GUIDANCE OF VEHICLES TO A WIRELESS CHARGER.

Signal Data Quantization

The quantization of the classifier and positioning model input data can be fixed-point or floating-point. In one configuration, the fixed-point data can be the direct output of an Analog-to-Digital Converter (ADC) with signed integer output. In another configuration, using a variable or automatic gain block in front of the ADC, the input data can be represented as floating-point data with an exponent and mantissa using a standard format, e.g., IEEE-754, or a custom format more suited for the capabilities of the processing element.

Signal Data Averaging

Each signal sample contains signal magnitude and phase of the known transmitted signal. With the full-duplex signal and a minimum of one transmitter and two (paired) receivers per unit (1 group unit, 1 vehicle or target unit), a sample will contain 2 uplink magnitudes, 1 computed uplink phase difference, 2 downlink magnitudes, and 1 computed downlink phase difference. The accuracy of the region classification and the positioning models can be improved by averaging the model input data prior to training and then in operation. The amount of averaging, or the number of samples used to compute the average, can be fixed, e.g., 2, 4, . . . , or variable. In the variable case, the number of samples for the average may be determined using a suitable algorithm (e.g., as a function of the vehicle speed and the spatial response of the models).

Broadband Signaling

With the inductive full-duplex signal and a minimum of one transmitter and two (paired) receivers per unit (1 ground unit, 1 vehicle or target unit) there are always two or more spatially diverse receive antennas. Generally, the inductive communications system uses the internationally standardized Industrial, Scientific, and Medical (ISM) bands below 100 megahertz which have fairly narrow bandwidths.

One method to improve the spatial resolution from what can be achieved using the relatively narrowband communications signals is to generate, transmit, and receive a broadband signal. The broadband signal can be constructed using two or more CW tones or alternatively using a known pseudo-random noise sequence that occupies most, if not all, of the available channel bandwidth. These signals can be processed using broadband techniques, e.g., carrier phase differences in the case of CW tones or correlation phase if using pseudo-random sequences.

CONCLUSION

While examples have been provided for commercial vehicles such as buses, drayage vehicles, and delivery vehicles, it will be appreciated that the methods described herein may also be applied to non-commercial vehicles such as EVs driven by individuals with or without software-based driving assistance. These same methods can be used for autonomously driven vehicles.

We claim:

1. A method for determining a position offset between a primary coil and a secondary coil of an inductive power transfer pair disposed in a vehicle transceiver assembly (VTA) and a ground transceiver assembly (GTA), comprising:

establishing a duplex communications channel between a wireless charging controller of the GTA including one of the primary coil or the secondary coil and a wireless charging controller of the VTA including another of the primary coil or the secondary coil;

obtaining a region classifier model of an operational charging region between the primary coil and the secondary coil, the region classifier model being implemented as a single model classifier having a plurality of input nodes for a given classifier comprising magnitudes and phase differences obtained from a receive antenna of the secondary coil, an output of the region classifier model indicating whether particular inputs are from inside or outside the operational charging region;

obtaining an operational charging region absolute position model of the operational charging region between the primary coil and the secondary coil, the operational charging region absolute position model being implemented as at least one single-variable regressor, each regressor having a plurality of input nodes comprising magnitudes and phase differences obtained from radio receivers of the wireless charging controller of the GTA and the wireless charging controller of the VTA, an output of the operational charging region absolute position model indicating from where a particular input was received from within the operational charging region;

concurrently collecting radio signal information at the radio receivers of the wireless charging controller of the GTA and the wireless charging controller of the VTA, the radio signal information including the magnitudes and phase differences obtained from the radio receivers of the wireless charging controller of the GTA and the wireless charging controller of the VTA;

determining whether the primary coil or the secondary coil has entered or departed the operational charging region of the secondary coil or the primary coil, respectively, using the collected radio signal information and the region classifier model;

when the primary coil or the secondary coil is within the operational charging region of the secondary coil or the primary coil, respectively, using the operational region absolute position model and the collected radio signal information to determine absolute or relative offset positions of a boresight of the primary coil and a boresight of the secondary coil; and providing to a display an indicator representing the absolute or relative offset positions between the boresights of the primary coil and the secondary coil.

2. The method of claim 1, further comprising adjusting a position of a vehicle having the VTA as needed to lower an absolute or relative offset between the boresights of the primary coil and the secondary coil.

3. The method of claim 2, further comprising displaying on the display at least one of a direction to minimize the relative offset between the boresights of the primary coil and the secondary coil or an indication of when the vehicle has overrun or otherwise departed the operational charging region.

4. The method of claim 2, further comprising charging the vehicle once the vehicle position is established and the vehicle is stationary.

5. The method of claim 1, further comprising uploading or downloading the obtained region classifier model and the obtained operational charging region absolute position model for processing prior to collecting the radio signal information.

6. The method of claim 1, wherein concurrently collecting radio signal information comprises using a direct sequence spread spectrum radio scheme to sample I and Q channels of an antenna of the secondary coil at a multiple of a display rate of the indicator on the display.

7. The method of claim 1, further comprising providing to the display at least one of absolute X and Y offsets of the boresights of the primary coil and the secondary coil, a directional indicator indicating a direction of movement of the vehicle, a last computed position when the vehicle existed in the operational charging region, or a directional map showing an entry and an exit to the operational charging region by the vehicle.

8. The method of claim 7, further comprising displaying an absolute X, Y position of the primary coil or the secondary coil mounted on the vehicle on a Cartesian plane map with a boresight at an origin (X=0, Y=0) of the operational charging region.

9. The method of claim 1, further comprising timestamping the concurrently collected radio signal information and transmitting the timestamped concurrently collected radio signal information over the duplex communications channel.

10. The method of claim 1, wherein obtaining the region classifier model and the operational charging region absolute position model comprises accessing a persistent memory of the wireless charging controller of the VTA to access a default model or a previously uploaded model based on a serial number of the GTA or the VTA.

11. The method of claim 10, wherein obtaining the region classifier model and the operational charging region absolute position model comprises obtaining different models for the vehicle based on at least one of loadout of the vehicle, direction of approach by the vehicle to the GTA, an ability of the vehicle to change a gap between the primary coil and the secondary coil by 'kneeling' or otherwise lowering a chassis of the vehicle, or presence of a movable coil assembly of the vehicle that lowers from a chassis of the vehicle for charging.

12. The method of claim 1, wherein the operational charging region comprises a region around an antenna boresight of the GTA, further comprising training the region classifier model and the operational charging region absolute position model by moving a vehicle having the VTA and associated communications antennas over the region and creating a grid of readings with each vertex of the grid having I and Q uplink received signal strengths for both antennas in a receiver pair and an uplink signal phase difference and having I and Q downlink received signal strengths for both antennas in the receiver pair and a computed downlink phase difference.

13. The method of claim 12, wherein training the region classifier model and the operational charging region absolute position model further comprises moving a paired set of a VTA and a GTA in a regular pattern and taking the grid of readings over the operational charging region at various altitudes (layers) to create a three-dimensional matrix of bins having different layers.

14. The method of claim 1, further comprising implementing the region classifier model using a multilayer perceptron and optimizing weights of the multilayer perceptron during training and storing the weights in a vector for use in classification.

15. The method of claim 1, further comprising implementing the operational charging region absolute position model using a multilayer perceptron and optimizing weights of the multilayer perceptron during training and storing the weights in a vector for use in regression.

16. The method of claim 1, wherein providing the indicator to the display includes displaying an arrow that directs attention of a driver of the vehicle to an absolute or relative offset between the boresights of the primary coil and the secondary coil and any correction needed to achieve a boresight-to-boresight alignment of the primary coil and the secondary coil.

17. The method of claim 1, further comprising providing information from the vehicle to the display and combining the vehicle information with a displayed position of the vehicle in the operational charging region, the vehicle information comprising at least one of speed, direction (forward/reverse), or angle of steering of the vehicle.

18. The method of claim 17, further comprising displaying a graphic representing a last computed position of the vehicle within the operational charging region, the graphic denoting a direction of exit of the vehicle from the operational charging region.

19. The method of claim 17, wherein the vehicle is an autonomous vehicle, further comprising, once the operational charging region has been entered by the autonomous vehicle, sending absolute coordinates to an autonomous driving system of the autonomous vehicle showing a current position of the autonomous vehicle for purposes of improving an autonomous alignment of the autonomous vehicle for charging or discharging and adjusting the current position of the autonomous vehicle until an absolute or relative offset between the boresights of the primary coil and the secondary coil are below a predictive threshold based on at least one of power level requested, magnetic flux leakage allowed, efficiency thresholds, coupling factors, predicted charging or discharging time, or thermal estimates for each GTA and motion of the autonomous vehicle ceases or the current position of the autonomous vehicle is no longer in the operational charging area.

20. The method of claim 1, further comprising displaying position indications of the boresights of the primary coil and secondary coil and corrective measures when an absolute or relative offset between the boresights of the primary coil and the secondary coil are below a predetermined threshold based on at least one of power level requested for charging or discharging, magnetic flux leakage allowed, an efficiency threshold, a coupling factor, a predicted charging or discharging time, or thermal estimates for each GTA.

21. A system that determines a position offset between a primary coil and a secondary coil of an inductive power transfer pair disposed in a vehicle transceiver assembly (VTA) including a wireless charging controller that controls one of the primary coil or the secondary coil and a ground transceiver assembly (GTA) having a wireless charging controller that controls another of the primary coil or the secondary coil, the wireless charging controllers of the VTA and GTA establishing a duplex communications channel therebetween and the primary coil and secondary coil comprising respective antennas, the system comprising:

a region classifier model of an operational charging region between the primary coil and the secondary coil, the region classifier model being implemented as a single model classifier having a plurality of input nodes for a given classifier comprising magnitudes and phase differences obtained from an antenna of the secondary coil, an output of the region classifier model indicating whether particular inputs are from inside or outside the operational charging region;

an operational charging region absolute position model of the operational charging region between the primary coil and the secondary coil, the operational charging region absolute position model being implemented as at least one single-variable regressor, each regressor having a plurality of input nodes comprising magnitudes and phase differences obtained from the respective antennas, an output of the operational charging region absolute position model indicating from where a particular input was received from within the operational charging region;

a controller adapted to concurrently collecting radio signal information at the respective antennas, the radio signal information including magnitudes and phase differences obtained from the antennas; determining whether an operational charging region of the primary coil or the secondary coil has entered or departed the operational charging region of the secondary coil or the primary coil, respectively, using the collected radio signal information and the region classifier model; and when the primary coil or the secondary coil is within the operational charging region of the secondary coil or the primary coil, respectively, using the operational region absolute position model and the collected radio signal information to determine absolute or relative offset positions of a boresight of the primary coil and a boresight of the secondary coil; and a display that receives an indicator representing the absolute or relative offset positions between the boresights of the primary coil and the secondary coil.

22. The system of claim 21, wherein the display further displays at least one of a direction to minimize a relative offset between the boresights of the primary coil and the secondary coil or an indication of when the vehicle has overrun or otherwise departed the operational charging region.

23. The system of claim 21, wherein the display further displays at least one of absolute X and Y offsets of the boresights of the primary coil and the secondary coil, a directional indicator indicating a direction of movement of the vehicle, a last computed position when the vehicle existed in the operational charging region, or a directional map showing an entry and an exit to the operational charging region by the vehicle.

24. The system of claim 23, wherein the display further displays an absolute X, Y position of the primary coil or the secondary coil mounted on the vehicle on a Cartesian plane map with a boresight at an origin (X=0, Y=0) of the operational charging region.

25. The system of claim 21, wherein the controller time-stamps the concurrently collected radio signal information and transmits the timestamped concurrently collected radio signal information over the duplex communications channel.

26. The system of claim 21, wherein the region classifier model comprises a multilayer perceptron having weights that are optimized during training and stored in a vector for use in classification.

27. The system of claim 21, wherein the operational charging region absolute position model comprises a multilayer perceptron having weights that are optimized during training and stored in a vector for use in regression.

28. The system of claim 21, wherein the display displays an arrow that directs attention of a driver of the vehicle to an absolute or relative offset between the boresights of the primary coil and the secondary coil and any correction needed to achieve a boresight-to-boresight alignment of the primary coil and the secondary coil.

29. The system of claim 21, wherein the display displays information from the vehicle with a displayed position of the vehicle in the operational charging region, the vehicle information comprising at least one of speed, direction (forward/reverse), or angle of steering of the vehicle.

30. The system of claim 29, wherein the display displays a graphic representing a last computed position of the vehicle within the operational charging region, the graphic denoting a direction of exit of the vehicle from the operational charging region.

31. The system of claim 29, wherein the vehicle comprises an autonomous vehicle, wherein, once the operational charging region has been entered by the autonomous vehicle, the controller sends absolute coordinates to an autonomous driving system of the autonomous vehicle showing a current position of the autonomous vehicle for purposes of improving an autonomous alignment of the autonomous vehicle for charging or discharging and adjusting a position of the autonomous vehicle until an absolute or relative offset between the boresights of the primary coil and the secondary coil are below a predictive threshold based on at least one of power level requested, magnetic flux leakage allowed, efficiency thresholds, coupling factors, predicted charging or discharging time, or thermal estimates for each GTA and motion of the autonomous vehicle ceases or the current position of the autonomous vehicle is no longer in the operational charging area.

32. The system of claim 21, wherein the display displays position indications of the boresights of the primary coil and secondary coil and corrective measures when an absolute or relative offset between the boresights of the primary coil and the secondary coil are below a predetermined threshold based on at least one of power level requested for charging or discharging, magnetic flux leakage allowed, an efficiency threshold, a coupling factor, a predicted charging or discharging time, or thermal estimates for each GTA.

33. The system of claim 21, wherein the GTA includes a first inductive receiver antenna and a second inductive receiver antenna arranged in a direction of travel of the vehicle and an inductive transmitter antenna centered within the GTA.

34. The system of claim 33, wherein the VTA includes a first inductive receiver antenna and a second inductive receiver antenna on a perimeter of the VTA on either side of an axis of travel and a transmission antenna centrally located in the VTA, wherein the first and second receiver antennas of the GTA are situated to be orthogonal to the first and second receiver antennas of the VTA.

35. The system of claim 33, wherein the VTA includes a centrally located transmission antenna, a first pair of receive antennas mounted outside the centrally located transmission antenna and transverse to an axis of travel of the vehicle, and a second pair of receive antennas mounted outside the centrally located transmission antenna and lateral to the axis of travel of the vehicle.

36. The system of claim 33, wherein the GTA further includes a third inductive receiver antenna and a fourth inductive receiver antenna arranged transverse to the direction of travel of the vehicle.

37. The system of claim 21, wherein the GTA includes a first inductive receiver antenna and a second inductive receiver antenna arranged across a direction of travel of the vehicle and an inductive transmitter antenna centered within the GTA.

38. The system of claim 37, wherein the VTA includes a first inductive receiver antenna and a second inductive receiver antenna on a perimeter of the VTA along a direction of travel and a transmission antenna centrally located in the VTA, wherein the first and second receiver antennas of the GTA are situated so as to be orthogonal to the first and second receiver antennas of the VTA.

39. The system of claim 37, wherein the VTA includes a centrally located transmission antenna and four receive antennas deployed at four respective corners of the VTA.

40. The system of claim 39, further comprising a software-defined radio that selectively creates samples from chosen pairs of antennas to selectively determine a direction of approach of the vehicle to the GTA and a left/right distance on either side of the axis of travel of the vehicle.

41. A ground transceiver assembly (GTA) comprising a first coil adapted for wireless power transfer with a second coil of a vehicle comprising a vehicle transfer assembly (VTA), the first coil including a first inductive receiver antenna and a second inductive receiver antenna arranged in a direction of travel of the vehicle or across a direction of travel of the vehicle and adapted to establish a duplex communications channel with the VTA, an inductive transmit/receive antenna centered between the first and second inductive receiver antennas within the GTA and adapted to conduct wireless power transfer with the second coil, a third inductive receiver antenna and a fourth inductive receiver antenna arranged perpendicular to the first and second inductive receiver antennas on opposing sides of the inductive transmit/receive antenna and adapted to establish a second duplex communication channel with the VTA, and a software-defined radio that selectively creates samples from chosen pairs of antennas to selectively determine a direction of approach of the vehicle to the GTA and a left/right distance on either side of the axis of travel of the vehicle.

42. A vehicle transceiver assembly (VTA) of a vehicle, the VTA comprising a first coil adapted for wireless power transfer with a second coil of a ground transfer assembly (GTA), the first coil including a first inductive receiver antenna and a second inductive receiver antenna arranged in a direction of travel of the vehicle or across a direction of travel of the vehicle and adapted to establish a duplex communications channel with third and fourth receiver antennas of the GTA, an inductive transmit/receive antenna centered between the first and second inductive receiver antennas within the VTA and adapted to conduct wireless power transfer with the second coil, wherein the first and second receiver antennas of the VTA are situated to be orthogonal to the third and fourth receiver antennas of the GTA, a fifth inductive receiver antenna and a sixth inductive receiver antenna arranged perpendicular to the first and second inductive receiver antennas on opposing sides of the inductive transmit/receive antenna and adapted to establish a second duplex communication channel with the GTA, and a software-defined radio that selectively creates samples from chosen pairs of antennas to selectively determine a direction of approach of the vehicle to the GTA and a left/right distance on either side of the axis of travel of the vehicle.

43. A vehicle transceiver assembly (VTA) of a vehicle, the VTA comprising a first coil adapted for wireless power transfer with a second coil of a ground transfer assembly (GTA), the first coil including four inductive receiver antennas deployed at four respective corners of the VTA and adapted to establish at least one duplex communications channel with receiver antennas of the GTA, an inductive transmit/receive antenna centrally located within the VTA and adapted to conduct wireless power transfer with the second coil, and a software-defined radio that selectively creates samples from chosen pairs of antennas to selectively determine a direction of approach of the vehicle to the GTA and a left/right distance on either side of the axis of travel of the vehicle.

* * * * *